United States Patent
Nabetani

(10) Patent No.: US 10,257,735 B2
(45) Date of Patent: Apr. 9, 2019

(54) WIRELESS COMMUNICATION DEVICE AND WIRELESS COMMUNICATION METHOD FOR CONTROLLING TRANSMISSION TIMING BASED ON COMMUNICATION QUALITY

(71) Applicant: KABUSHIKI KAISHA TOSHIBA, Minato-ku, Tokyo (JP)

(72) Inventor: Toshihisa Nabetani, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 82 days.

(21) Appl. No.: 15/420,753

(22) Filed: Jan. 31, 2017

(65) Prior Publication Data

US 2017/0251392 A1 Aug. 31, 2017

(30) Foreign Application Priority Data

Feb. 25, 2016 (JP) ................................. 2016-034740

(51) Int. Cl.
*H04L 12/28* (2006.01)
*H04W 24/10* (2009.01)
(Continued)

(52) U.S. Cl.
CPC .......... *H04W 24/10* (2013.01); *H04B 7/0452* (2013.01); *H04B 7/0617* (2013.01);
(Continued)

(58) Field of Classification Search
USPC ................................ 370/252, 278, 329, 430
See application file for complete search history.

(56) References Cited

U.S. PATENT DOCUMENTS

2007/0230373 A1* 10/2007 Li .................... H04B 7/0447
370/267
2008/0045153 A1* 2/2008 Surineni ............. H04B 7/0417
455/63.1
(Continued)

FOREIGN PATENT DOCUMENTS

JP 2010-232796 A 10/2010
JP 2013-046249 A 3/2013

OTHER PUBLICATIONS

IEEE Standards Association/IEEE Computer Society: "Part 11: Wireless LAN Medium Access Control (MAC) and Physical Layer (PHY) Specifications", IEEE Std 802.11™, The Institute of Electrical and Electronics Engineers, Inc., Mar. 2012, pp. 1-2793.
(Continued)

*Primary Examiner* — John Pezzlo
(74) *Attorney, Agent, or Firm* — Foley & Lardner LLP

(57) ABSTRACT

According to one embodiment, a wireless communication device includes: a transmitter configured to transmit a first frame, the first frame being a frame for channel estimation; a receiver configured to receive a second frame, the second frame including channel information; and controlling circuitry. The transmitter is configured to transmit a third frame by beamforming based on the channel information. The controlling circuitry is configured to measure a communication quality of a channel based on a response frame to the third frame and control a transmission timing of the first frame based on the communication quality and a transmission rate of the third frame.

18 Claims, 14 Drawing Sheets

(51) Int. Cl.
*H04B 7/0452* (2017.01)
*H04W 72/08* (2009.01)
*H04B 7/06* (2006.01)
*H04J 1/16* (2006.01)
*H04W 84/12* (2009.01)

(52) U.S. Cl.
CPC ........ *H04B 7/0626* (2013.01); *H04W 72/085* (2013.01); *H04W 84/12* (2013.01)

(56) References Cited

U.S. PATENT DOCUMENTS

| | | | | |
|---|---|---|---|---|
| 2011/0002371 | A1* | 1/2011 | Forenza | H04B 7/0417 375/227 |
| 2014/0362695 | A1* | 12/2014 | Ho | H04L 47/225 370/230 |
| 2016/0143026 | A1* | 5/2016 | Seok | H04W 72/0413 370/329 |
| 2016/0192351 | A1* | 6/2016 | Kwon | H04W 72/0413 370/329 |
| 2016/0330732 | A1* | 11/2016 | Moon | H04B 7/0617 |

OTHER PUBLICATIONS

IEEE Standards Association/IEEE Computer Society: "Part 11: Wireless LAN Medium Medium Access Control (MAC) and Physical Layer (PHY) Specifications; Amendment 4: Enhancements for Very Throughput for Operation in Bands Below 6 GHz", IEEE Std 802.11ac™, The Institute of Electrical and Electronics Engineers, Inc., Dec. 2013, pp. 1-425.

* cited by examiner

WIRELESS COMMUNICATION DEVICE AND WIRELESS COMMUNICATION METHOD FOR CONTROLLING TRANSMISSION TIMING BASED ON COMMUNICATION QUALITY

CROSS REFERENCE TO RELATED APPLICATIONS

This application is based upon and claims the benefit of priority from the prior Japanese Patent Application No. 2016-034740, filed on Feb. 25, 2016, the entire contents of which are incorporated herein by reference.

FIELD

Embodiments of the present invention relate to a wireless communication device and a wireless communication method.

BACKGROUND

IEEE802.11ac is a wireless local area network (LAN) standard and defines a downlink multi-user multiple input multiple output (DL-MU-MIMO) transmission scheme. DL-MU-MIMO uses a technique called "beamforming" and forms spatially orthogonal beams for multiple terminals. For the beam formation, an access point needs to obtain channel information indicative of downlink channels with the respective terminals and calculate weights on a per-terminal basis in accordance with their respective channels. For this purpose, the access point transmits frames for sounding (e.g., null data packets) to the respective terminals, and receives feedback of the downlink channel information indicative of the downlink channels measured in the terminals. In this manner, the access point obtains the pieces of the downlink channel information of the respective terminals.

Since the channels of the respective terminals are susceptible to variations under the influence of Doppler variation, it is necessary for the access point to periodically carry out sounding and identify the variations in the channels in order to apply optimum weights for the terminals. As a relevant technology, a method is proposed according to which re-sounding is carried out when an elapsed time after the previous sounding exceeds a threshold. This is a simple method because the sounding is periodically carried out at a particular time cycle in response to variations in channels. In normal cases, a possible approach is to assume a certain presupposed channel model (Doppler frequency) and decide on the time cycle of operation. However, if the time cycle of operation is too long, it may happen that an actual variation in a channel takes place too early relative to the operation time cycle, which may lead to degradation in the characteristics. On the other hand, if the operation time cycle is too short, the system overhead becomes large. This may lead to degradation in the communication efficiency (throughput).

DETAILED DESCRIPTION

According to one embodiment, a wireless communication device includes: a transmitter configured to transmit a first frame for channel estimation; a receiver configured to receive a second frame including channel information; and controlling circuitry. The transmitter is configured to transmit a third frame by beamforming based on the channel information. The controlling circuitry is configured to measure a communication quality of a channel based on a response frame to the third frame and control a transmission timing of the first frame based on the communication quality and a transmission rate of the third frame.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

First Embodiment

Figure 1:
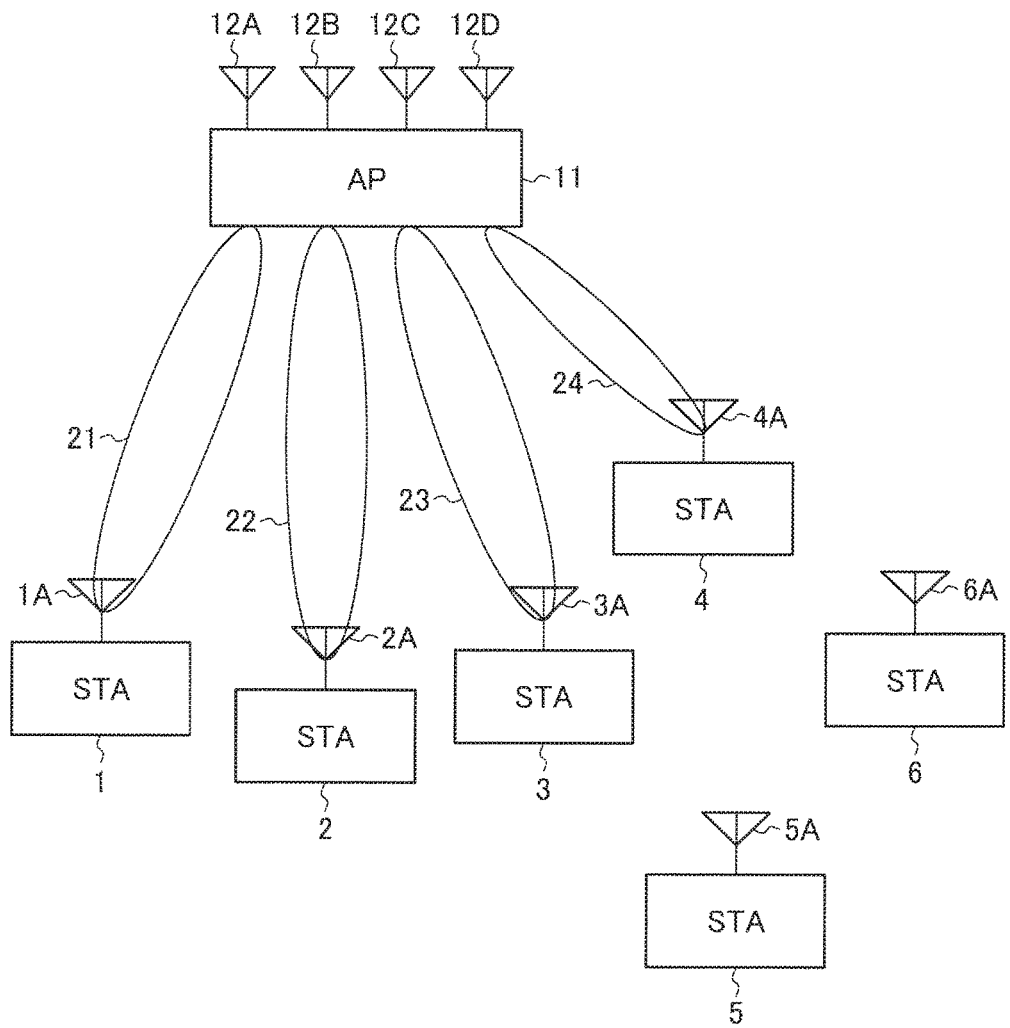
FIG. 1 is a diagram illustrating a wireless communication system in accordance with a first embodiment.

FIG. 1 is a configuration of a wireless communication system according to the embodiment. The wireless communication system includes an access point (AP: Access Point) 11 which is a base station, and wireless communication terminals 1 to 6 which are not base stations. The wireless communication terminals may be referred to as terminals, wireless terminals, or stations (STA) in some cases. The access point 11 is also one form of terminal, except for having a relay function, since it has the functions of a terminal. The access point 11 and the terminals 1 to 6 wirelessly communicate with each other in accordance with any wireless communication scheme. As an example, the communication complying with the IEEE802.11 standard is carried out. A wireless communication device equipped in the terminal communicates with a wireless communication device equipped in an access point. The wireless communication device equipped in the access point communicates with the wireless communication device equipped in the terminal. A wireless LAN based on the IEEE802.11 standard is assumed for the wireless communication system in the embodiment without limitation. The IEEE802.11 standard may refer to any of IEEE802.11b, IEEE802.11a, IEEE802.11n, IEEE802.11ac, and IEEE802.11ax that is a next generation wireless LAN standard, or those other than these.

The access point 11 includes one or a plurality of antennas. In the example of FIG. 1, the access point 11 includes four antennas 12A, 12B, 12C, and 12D. The access point may be equipped with more or fewer antennas than those illustrated in the example of FIG. 1. The terminals 1 to 6 each include one or more antennas. In this example, the terminals 1 to 4 each include one antenna from the antennas indicated by 1A, 2A, 3A, and 4A, respectively.

The terminals 1 to 6 connect with the access point 11 to form a wireless communication system or a wireless communication group (BSS: Basic Service Set) between the terminal and the access point 11. The connection means a state where a wireless link is established, and a parameter required for the communication is completely exchanged by way of the association process with the access point so as to establish the wireless link. Each of the terminals 1 to 6 establishing the wireless link has an Association ID (AID) allocated from the access point. The AID is an identifier given in the association process which is performed between the terminal and the access point in order that the terminal belongs to the BSS of the access point. More specifically, in a case where the access point authorizes the terminal that transmitted a connection request (Association Request) frame to connect therewith, it allocates a number which is generated locally in the relevant network to the terminal. The number is what is called the AID, and a certain number in a specified range other than 0 is allocated. The AID is allocated so as to be unique in that network (BSS). The AP transmits a connection response (Association Response) frame containing the allocated AID to the terminal which is to be authorized to connect therewith. The terminal grasps its AID by reading out the AID from the connection response frame. The terminal receives the connection response frame for the connection authorization from the access point to be able to belong to the BSS formed by the access point and thereafter communicate with the access point. Such a process for connection between the access point and the terminal is called an association process. The AP may perform an Authentication process before the association process with the terminal. The access point can identify the terminal connected with itself by means of the AID or a MAC address.

Figure 2:
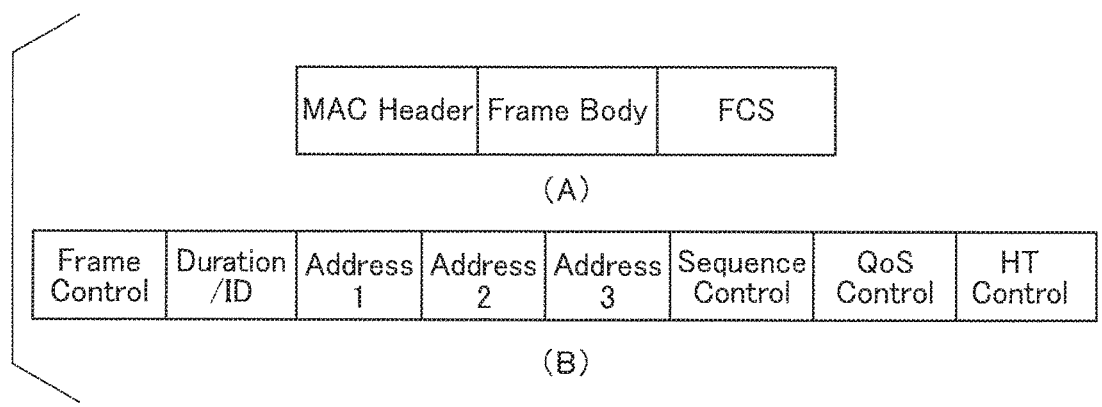
FIG. 2 is a diagram illustrating an example basic format of a MAC frame.

FIG. 2(A) illustrates the basic exemplary format of the MAC frame. A type of a frame is roughly classified into a data frame, a management frame, and a control frame and any type of the frame is based on a frame format as shown in FIG. 2(A). This frame format includes the fields of MAC header, Frame body, and FCS. The MAC header includes, as illustrated in FIG. 2(B), the fields of Frame Control, Duration/ID, Address 1, Address 2, Address 3, Sequence Control, QoS Control, and HT (High Throughput) Control.

These fields do not need to always exist and there may be cases where some of these fields do not exist. For example, there may be a case where the Address 3 field does not exist. Also, there may be other cases where both or either one of the QoS Control field and the HT Control field does not exist. Also, there may be still other cases where the frame body field does not exist. Also, any field or fields that are not illustrated in FIG. 2 may exist. For example, an Address 4 field may further exist. The HT control field can be extended to a VHT (Very High Throughput) control field in IEEE 802.11ac or an HE (High Efficient) control field in IEEE 802.11ax which is a next-generation wireless LAN standard.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

Two fields of Type and Subtype (Subtype) or the like are set in the Frame Control field. The rough classification as to whether it is the data frame, the management frame, or the control frame is made by the Type field, and more specific types, for example, fine discrimination among the roughly classified frames, for example, as to whether it is a BA (Block Ack) frame or a BAR (Block Ack Request) frame within the control frame is made by the Subtype field.

The Duration/ID field describes the medium reserve time, and it is determined that the medium is virtually in the busy state from the end of the physical packet including this MAC frame to the medium reserve time when a MAC frame addressed to another terminal is received. The scheme of this type to virtually determine that the medium is in the busy state, or the period during which the medium is virtually regarded as being in the busy state, is, as described above, called NAV (Network Allocation Vector).

The QoS control field is used to carry out QoS control to carry out transmission with the priorities of the frames taken into account. The QoS control field includes a TID field (16 types from 0 to 15) in which an identifier is set for data traffic, and an Ack policy field in which an acknowledgement scheme is set, and the like. The confirmation of the TID field enables to identify the traffic type of the data. Moreover, the confirmation of the Ack policy field enables to determine whether the QoS Data frame is a normal Ack policy or a block Ack policy or whether the data frame has been transmitted as No Ack policy.

The HT control field is a field introduced in IEEE 802.11n. The HT (High Throughput) control field is present when the Order field is set to 1 for QoS data frame or a management frame. As stated, the HT control field can be extended to a VHT (Very High Throughput) control field in IEEE 802.11ac or an HE (High Efficient) control field in IEEE 802.11ax which is a next-generation wireless LAN standard and can provide notifications corresponding to the functions of 802.11n, 802.11ac, or 802.11ax.

Figure 3:
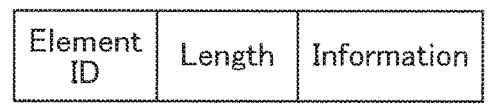
FIG. 3 is a diagram illustrating a format of an information element.

In the management frame, an information element (Information element; IE) to which a unique Element ID (IDentifier) is assigned is set in the Frame Body field. One or a plurality of information elements may be set in the frame body field. The information element has, as illustrated in FIG. 3, the fields of an Element ID field, a Length field, and an Information field. The information element is discriminated by the Element ID. The Information field is adapted to store the content of the information to be notified, and the Length field is adapted to store the length information of the information field. In the management frame, one or more predefined fields may be arranged depending on the frame type (Subtype) other than the information element.

Frame check sequence (FCS) information is set in the FCS field as a checksum code for use in error detection of the frame on the reception side. As an example of the FCS information, CRC (Cyclic Redundancy Code) may be mentioned.

The access point 11 is capable of transmitting a plurality of MAC frames (hereinafter referred to as "frames") to a plurality of terminals selected from the terminals 1 to 6 by a multi-user transmission scheme, in other words, capable of carrying out multiplexed transmission of the frames. As an example of the multi-user transmission scheme, the drawings illustrate a case where the frames addressed to the terminals 1 to 4 are transmitted by spatial multiplexing. Spatially multiplexed transmission refers to simultaneous transmission of a plurality of frames using the same frequency band. Specifically, the access point 11 transmits the frames addressed to the terminals 1 to 4 in accordance with downlink multi-user multi-input and multi-output (DL-MU-MIMO). DL-MU-MIMO is defined by the IEEE802.11ac standard. FIG. 1 illustrates a state where the access point 11 carries out DL-MU-MIMO with the four terminals 1 to 4. The access point 11 forms spatially orthogonal beams with the terminals 1 to 4.

DL-MU-MIMO forms spatially orthogonal beams for a plurality of terminals using a technique called "beamforming." Downlink channel information (channel information) indicative of downlink channels with the respective terminals is used for the beam formation. For that purpose, the access point, by way of example, transmits in advance frames for sounding (channel estimation frames) via the respective antennas to the respective terminals, and receives feedback of the downlink channel information measured by each terminal. Such a sequence is called "sounding." In this manner, the access point obtains the pieces of downlink channel information of the individual terminals.

The channel estimation frame includes a known signal. The terminals identify variations in amplitudes and phases on the basis of the amplitudes and phases of the actually received signals and the amplitude and phase of the known signal and provide feedback of the channel information, which indicates the variations in the amplitudes and the phases, for the access point. More specifically, the access point carries out the sounding for each of the antennas that the access point itself is equipped with, and thereby obtains, on a per-antenna basis, pieces of channel information of the terminals with respect to the respective antennas. The access point manages, for the antennas of the access point itself, the pieces of the channel information obtained from the respective terminals in the form of a channel matrix (channel matrix). The channel matrix is a matrix constituted by the amount of variations in the phases and amplitudes of the channels between the antenna of the access point (transmission antenna) and the terminals' antennas (reception antennas).

The access point uses the channel matrix and calculates weights for the respective terminals and the respective antennas so as to generate a plurality of directional beam patterns toward the respective terminals. A known method may be used for that purpose. The access point carries out weighting for the transmission signals to the terminals, on a per-antenna basis, using the weights for the respective antennas, and transmits the weighted transmission signals via the respective antennas. This operation is carried out for each of the terminals. Accordingly, multiple transmission signals to multiple terminals are simultaneously transmitted via the respective antennas. By virtue of this, it is made possible to carry out the beamforming on a per-terminal basis. The terminals each appropriately receive their respective frames addressed to them, and does not receive frames other than those addressed to themselves (in other words, the transmission signals addressed to other terminals are not received or reception thereof is restricted).

Figure 4:
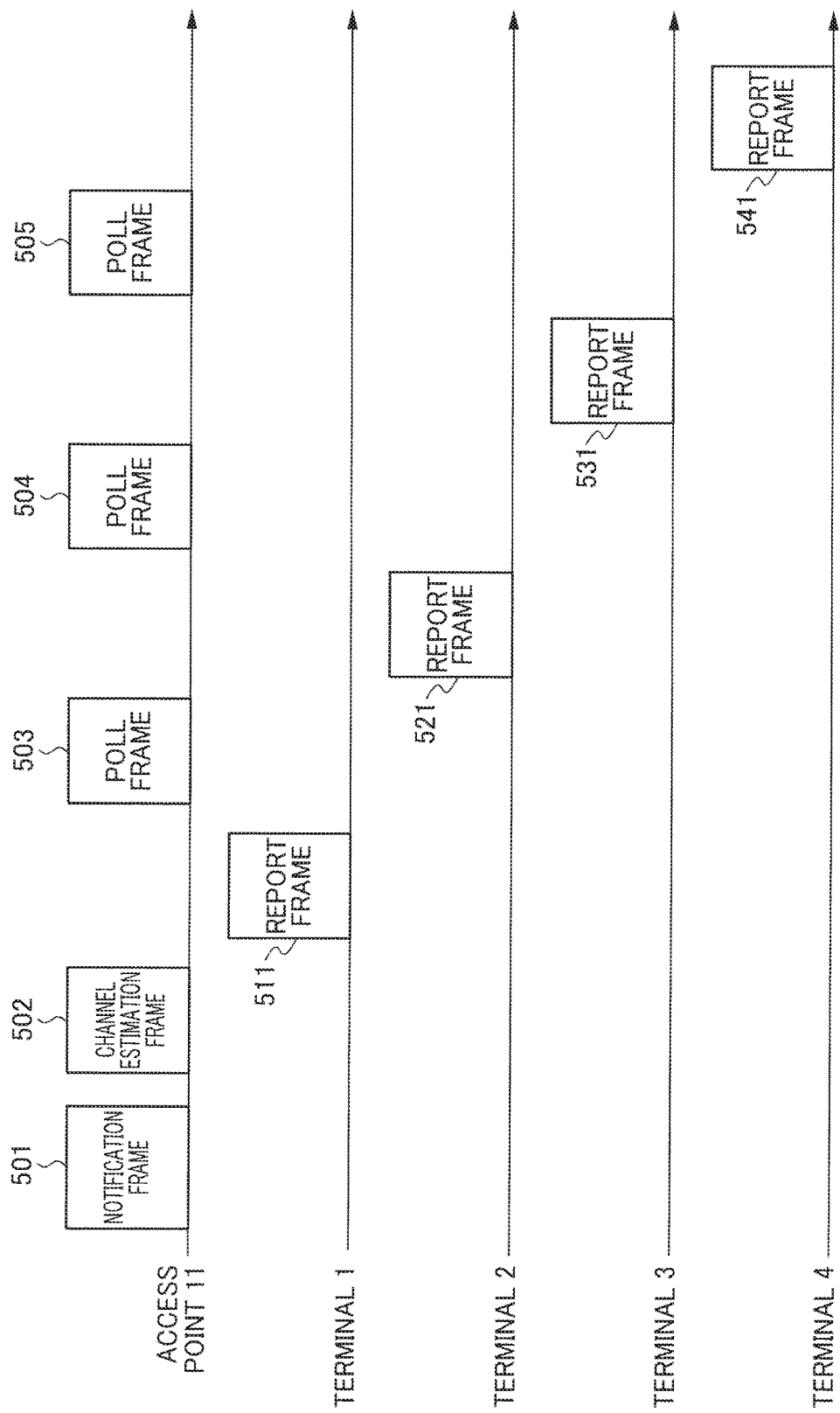
FIG. 4 is a diagram illustrating an example sequence of sounding.

FIG. 4 illustrates an example of the sounding. The signals (frames) transmitted by access point 11 and the terminals 1 to 4 are indicated by rectangles. The horizontal axes are time axes along which time elapses rightward.

The access point 11 obtains a right to access a wireless medium in accordance with CSAM/CA. Specifically, the access point 11 performs carrier sensing during a period from a randomly determined back-off time to a fixed time. When a clear channel assessment (CCA) is equal to or less than a threshold, the access point 11 determines that the wireless medium is in an idle state. As a result, the access point 11 obtains the right to access the wireless medium.

There, the fixed time period is the DIFS (Distributed coordination function InterFrame Space)/AIFS (Arbitration InterFrame Space). The DIFS/AIFS means any one of the DIFS and the AIFS. In a case of not QoS compliant the DIFS is meant, and in a case of QoS compliant the AIFS is meant which depends on an access category (AC) of the transmitted data.

The DIFS or the AIFS is an example, and another time (IFS) may be used so long as it is a predetermined time period. The DIFS, the AIFS or a SIFS (Short InterFrame Space) which are described elsewhere herein are similarly example and another time period may be used.

The access point 11 transmits notification frame 501 specifying corresponding the terminals 1 to 4 based on the obtained access right. As the notification frame 501, a VHT NDPA (Null Data Packet Announcement) frame may be used. A receiver address (RA) of the notification frame 501 is a broadcast address or a multicast address. A header or a body field of the notification frame 501 includes terminal information fields 1 to 4 that specify identification information identifying the terminals 1 to 4 (e.g., AID or MAC address, etc.).

The access point 11 transmits channel estimation frame 502 upon the lapse of an SIFS (Short Inter Frame Space) after completion of transmission of the notification frame 501. As an example of the channel estimation frame 502, a null data packet (NDP) can be used. The notification frame 501 include a known signal for the terminals to carry out the channel estimation.

When the terminals 1 to 4 have received the channel estimation frames 502, the terminals 1 to 4 each calculate downlink channel information on the basis of the channel estimation frames 502. The terminal that is specified by the terminal information field at a predetermined location in the notification frame 501 transmits a report frame including the calculated downlink channel information upon the lapse of an SIFS after completion of reception of the frame 502. In this example, the terminal 1 specified by the terminal information field 1 transmits the report frame 511 including the calculated downlink channel information upon the lapse of an SIFS after completion of reception of the frame 502. As an example of the report frame 511, a VHT compressed beamforming report frame can be used.

The access point generates and transmits a poll frame, which specifies a terminal which has not yet transmitted a report frame, upon the lapse of an SIFS after completion of reception of the report frame 511. In this example, a poll frame 503 that specifies the terminal 2 is transmitted. As an example of the poll frame 503, a Beamforming Report Poll frame can be used. When the terminal 2 has received the poll frame 503, the terminal 2 transmits a report frame 521 including the downlink channel information calculated based on the channel estimation frames 502 upon the lapse of an SIFS after completion of reception of the poll frame 503. A receiver address (RA) of the poll frame is an address of the terminal to which the frame is addressed, and a transmitter address (TA) thereof is a MAC address of the access point (BSSID). A receiver address (RA) of the report frame is the MAC address of the access point (BSSID), and a transmitter address (TA) is a MAC address of the terminal from which the frame is transmitted.

Thereafter, in the same manner, the access point 11 transmits a poll frame 504 to the terminal 3 and receives a report frame 531 from the terminal 3 upon the lapse of an SIFS after completion of transmission of the poll frame 504. Subsequently, the access point 11 transmits a poll frame 505 to the terminal 4 upon the lapse of an SIFS after completion of reception of the report frame 531 and receives a report frame 541 from the terminal 4 upon the lapse of an SIFS after transmission of the poll frame 505. In this manner, the access point 11 obtains the pieces of the downlink channel information from the respective terminals 1 to 4. It should be noted that the SIFS is only mentioned as an example and other amounts of time, i.e., interframe spaces (IFSs) may be relied upon as long as they represent a predetermined amount of time.

In the above-described sequence, the access point transmits the channel estimation frames simultaneously via the antennas while the individual terminals calculate their respective pieces of channel information with respect to the respective antennas of the access point. For that purpose, the access point specifies a plurality of pattern signals that are orthogonal to each other for the multiple channel estimation frames. The terminal that has received the frame separates the multiple channel estimation frames on the basis of the pattern signals. It is assumed here that the pattern signals are identified in advance by the individual terminals.

As another example, the channel estimation frame may be transmitted from one of the antennas of the access point, and the same sequence may be repeated by the other antennas. By virtue of this, the pieces of the channel information with respect to the respective terminals are obtained regarding all of the antennas. At this point, transmission of the notification frame may be performed only once and the sequence following the transmission of the channel estimation frame may be repeated for the number of rounds equal to the number of the antennas.

When the terminals 1 to 4 have received the channel estimation frame(s) 502, the terminals 1 to 4 may transmit their respective report frames so that the one that obtained the access right transmits its report frame first in accordance with CSMA/CA (Carrier Sense Multiple Access with Carrier Avoidance). In this case, it is not necessary to transmit poll frames from the access point.

Figure 5:
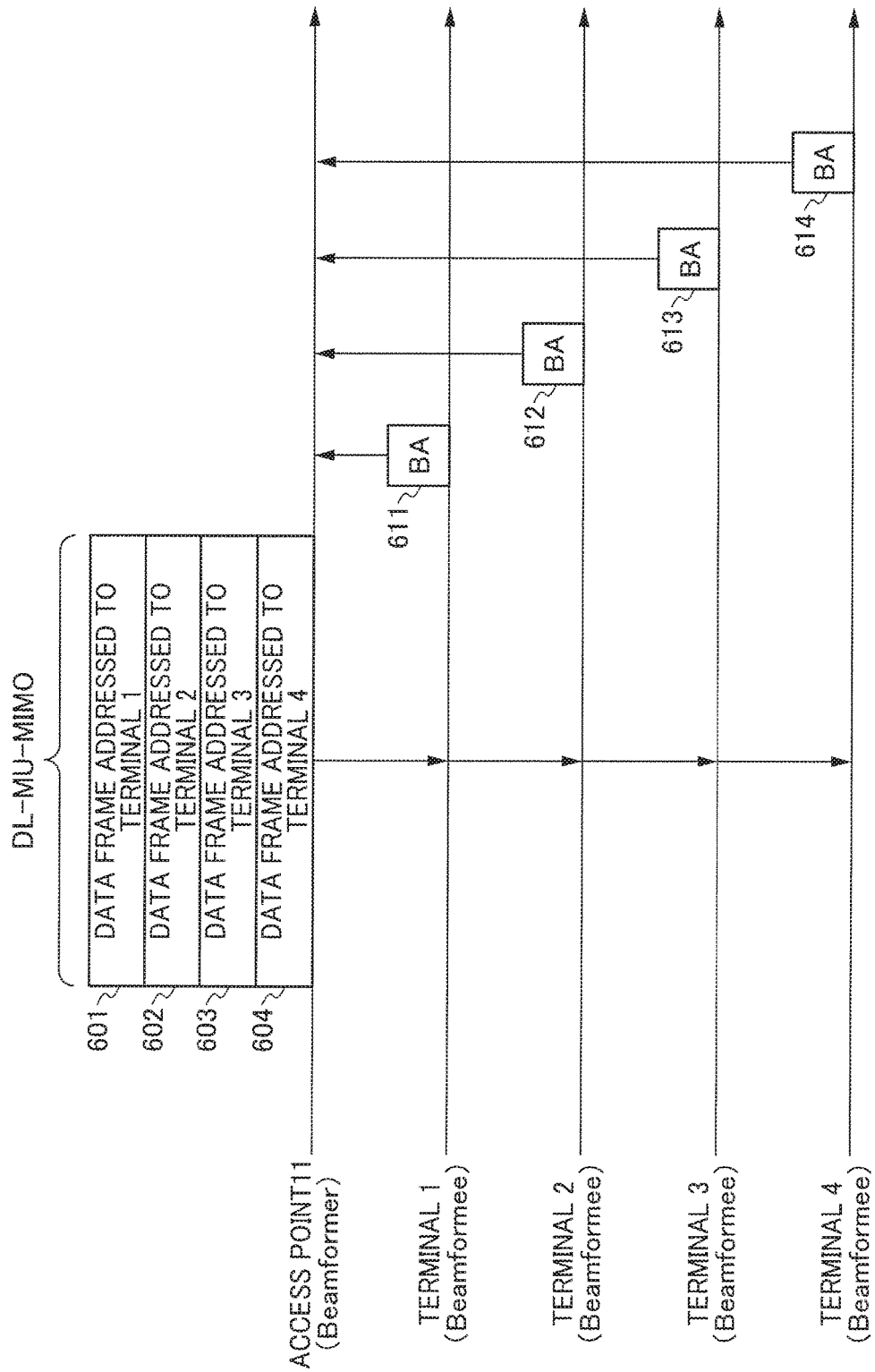
FIG. 5 is a diagram illustrating an example operation sequence of an access point and multiple terminals.

When the access point 11 carries out DL-MU-MIMO, the access point 11 uses the channel information obtained by the above-described sounding. FIG. 5 illustrates an example of the operation sequence in a case where DL-MU-MIMO is carried out.

Before DL-MU-MIMO is carried out, by way of example, communications between the access point 11 and all or part of the terminals 1 to 6 are individually carried out based on CSMA/CA (single-user communication). The single-user communication refers to a communication scheme according to which communications are performed between the access point and the individual terminals.

As an example of the single-user communication, when the terminal retains data for uplink transmission and the terminal performs carrier sensing in accordance with CSMA/CA and obtains a right to access a wireless medium, then the terminal transmits the data frame. It should be noted that the access right may be obtained by transmission and reception of an RTS (Request to Send) frame and a CTS (Clear to Send) frame.

The access point 11 checks whether or not the reception was successful on the basis of FCS information (CRC, etc.) of the data frame. When it has been determined that the reception was successful, then the access point 11 transmits an acknowledgement response frame (ACK frame) to the terminal upon the lapse of an SIFS. When the reception was not successful, the access point 11 does not return the acknowledgement response frame. It should be noted, as will be described later, that the data frame to be transmitted may be an aggregation frame that aggregates a plurality of data frames (aggregation MAC (medium access control) protocol data unit; A-MPDU). The individual frames included in the aggregation frame may be called "sub-frame." If the data frame transmitted by the terminal is an aggregation frame, then the acknowledgement response frame by which the access point 11 responds is a Block Ack (BA) frame that includes acknowledgement information indicative of acknowledgement (successful or unsuccessful) for each sub-frame.

As one of the single-user communications, the above-described sounding is performed as well.

When the access point 11 carries out DL-MU-MIMO, the access point 11 selects a plurality of terminals that are eligible for DL-MU-MIMO (i.e., the terminals 1 to 4 in this example) and generates data frames 601, 602, 603, and 604 that are transmitted to the terminals 1 to 4, respectively. Receiver addresses (RAs) of the data frames 601, 602, 603, and 604 are the MAC addresses of the terminals 1 to 4, respectively, and transmitter addresses (TAs) thereof are the MAC address of the access point (BSSID).

Also, the access point 11 determines transmission rates of the data frames 601, 602, 603, and 604. As the transmission rate, for example, MCS (Modulation and Coding Scheme) can be used. MCS defines a transmission rate by a set of a modulation scheme and a code rate. In this embodiment, an example is described where MCS is used as the transmission rates. The method of determining the MCS to be applied to the terminals will be described later. When the he access point 11 obtains an access right to access a wireless medium in accordance with CSMA/CA, then the access point 11 carries out user-multiplexed transmission of the data frames 601 to 604. More specifically, the access point 11 modulates the data frames 601 to 604 in accordance with their respective transmission rates, and transmits them by beamforming based on the channel information of the terminals 1 to 4. It should be noted that predefined MCS or MCS determined by a known method should be applied to the various frames transmitted and received in the sounding illustrated in FIG. 4. The upper limit of the total number of streams to be transmitted by DL-MU-MIMO is equal to or less than the number of antennas of the access point.

Although the data frames are transmitted to the terminals 1 to 4 in this example, a management frame or control frame may be transmitted. The data frames to be transmitted to the terminals 1 to 4 may be an aggregation frame (A-MPDU) that aggregates multiple data frames.

Here, various methods can be relied on to select terminals that are eligible for DL-MU-MIMO. For example, a method which selects terminals having low spatial correlations, a method which selects terminals having the same or similar data transmission periods, a method which selects terminals having the same or proximate transmission powers from the access point, and a method which selects terminals having the same data length (data size) transmitted from the access point may be mentioned. Also, a method may be used which randomly selects terminals. Methods other than those mentioned herein may also be used to select the terminals.

When the terminals 1 to 4 each receive the corresponding one of the data frames 601 to 604 which are multiplex-transmitted from the access point, the terminals 1 to 4 check whether or not the reception of the corresponding one of the data frames has been successful. Also, in accordance with the check result, the terminals 1 to 4 transmit the acknowledgement response frames (BA frames) 611, 612, 613, and 614 in this example upon the lapse of respective amounts of time that are different from each other after completion of reception of the data frames. By way of example, the terminal 1 transmits the BA frame upon the lapse of an SIFS after completion of reception of the data frame, the terminal 2 transmits the BA frame upon the lapse of a total time of 2×SIFS after completion of reception of the data frame plus a BA frame length, the terminal 3 transmits the BA frame upon the lapse of a total time of 3×SIFS after completion of reception of the data frame plus 2×BA frame length, and the terminal 4 transmits the BA frame upon the lapse of a total time of 4×SIFS after completion of reception of the data frame plus 3×BA frame length. It is assumed here that the BA frame lengths are constant.

As another method of transmitting the acknowledgement response frames, the acknowledgement response frames may be transmitted sequentially from the individual terminals by repeated operations of transmitting BAR (BlockAck Request) frames from the access point to the individual terminals and transmitting the ACK frames (or BA frames) upon the lapse of an SIFS after completion of transmission of the BAR frames (in other words, the setting is given as Delayed BA).

It should be noted that the frames which the access point 11 transmits to the terminals 1 to 4 by DL-MU-MIMO may be frames having the same or different content. As a general representation, when it is represented that the access point or the multiple terminals transmit or receive X-th frames, then the X-th frames have the same or different content, where X may take any appropriate value. The X-th frames may be transmitted simultaneously or transmitted one after another in time series. Both cases are envisaged.

Here, in practice, a physical header (PHY header) is added at the beginning of the frame transmitted by the access point and the frame transmitted by the terminals, and physical packets including the physical header and the frame are transmitted. The physical packet may also be called "physical frame."

Figure 6:
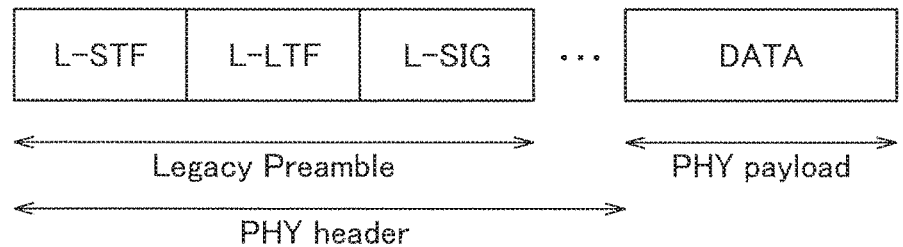
FIG. 6 is a diagram illustrating an example configuration of a physical packet.

FIG. 6 illustrates an example of a format of the physical packet. The physical packet includes a physical header and a PHY payload. The physical header includes a Legacy Preamble portion and a Preamble portion in accordance with various standards such as 11n, 11ac, 11ax, etc. The PHY payload is a data portion which includes a frame that has been subjected to modulation processing. The Legacy Preamble has the same configuration as that of the physical header defined in IEEE802.11a, and includes the fields of L-STF, L-LTF, and L-SIG. L-STF and L-LTF indicate known bit patterns. They are used for the receiver devices to carry out reception gain adjustment, timing synchronization, channel estimation, and the like. The L-SIG includes information for the receiver devices to calculate the time necessary for transmission of the Preamble portion that follows L-SIG and the PHY payload.

Figure 7:
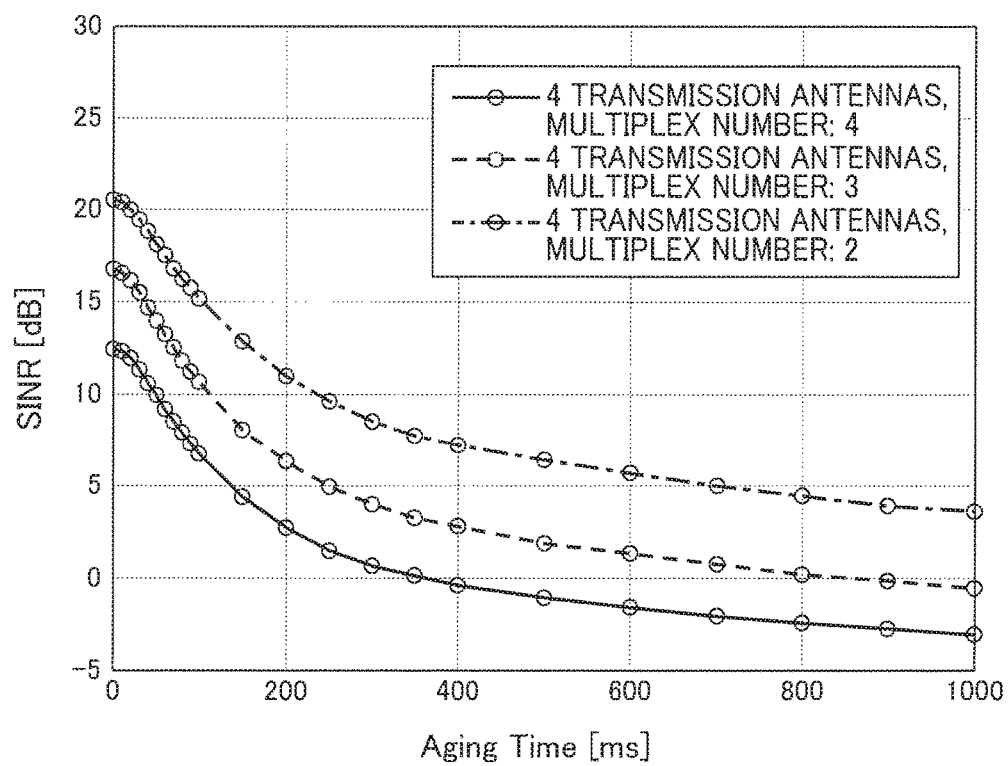
FIG. 7 is a diagram illustrating degradation in characteristics of channels.

The access point 11 repeatedly carries out, as an example of operation, DL-MU-MIMO transmission to the terminals 1 to 4 and the reception of the acknowledgement response frames from the terminals 1 to 4 as illustrated in FIG. 5. At this point, the channels with the respective terminals 1 to 4 vary due to the influence of the Doppler variation. Accordingly, when the same channel information is used, SINRs (Signal-to-Interference Noise Ratio) of the terminals are degraded with the aging of time. An example of the SINR degradation due to channel variation in DL-MU-MIMO is illustrated in FIG. 7, where Channel model D of IEEE802.11 is used. Degradation characteristics are illustrated in cases where the access point is equipped with four antennas while the user multiplex number (terminal multiplex number) is 4, 3, and 2, respectively. In any one of these cases, due to the influence of the Doppler variation, SINRs are degraded with the aging time. Also, it will be appreciated that a higher user multiplex number leads to a lower SINR. This is thought to be caused by the fact that the larger user multiplex number causes more serious signal interferences among users.

Accordingly, it is necessary for the access point to carry out the sounding at appropriate timings and identify the variations in the channels in order to carry out appropriate beamforming (to calculate and apply appropriate weights). In this respect, when the time cycle of the sounding is too long, then the actual channel variation occurs too early relative to the time cycle of the sounding, which may cause larger degradation in the SINR. In this case, frame errors (reception failure) in the terminals increase and it may happen that the communications cannot be carried out even with a low transmission rate (MCS). On the other hand, when the time cycle of the sounding is too short, then the sounding is excessively carried out, which causes increase in the system overhead. As described above, too long or too short time cycle of the sounding, in either case, lead to the degradation in the system throughput. In view of this, in this embodiment, the timing or frequency of estimating the channels is appropriately controlled.

Figure 8:
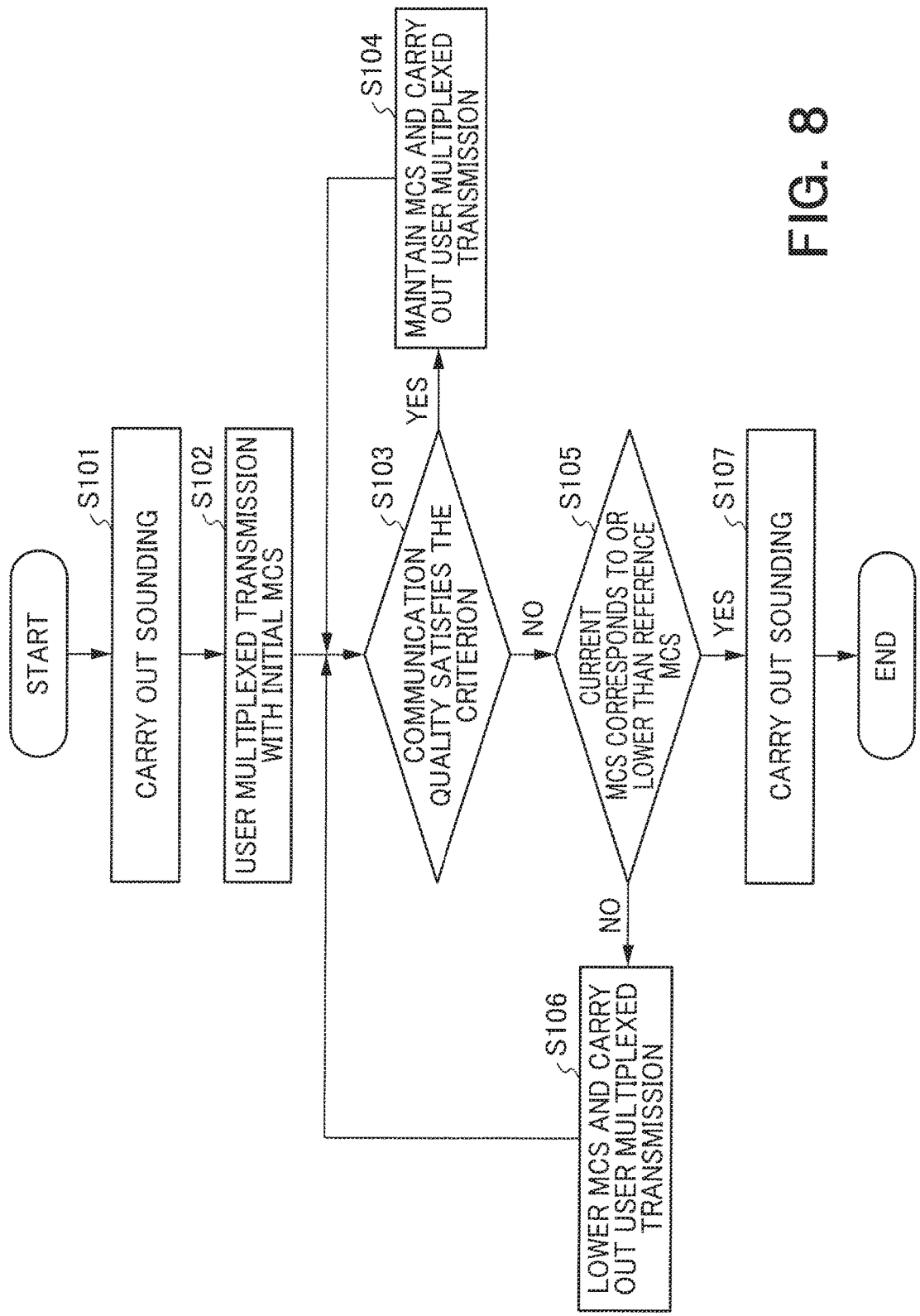
FIG. 8 is a flowchart of an example operation of the access point.

FIG. 8 is a flowchart of an example of operation of the access point in accordance with this embodiment. The access point carries out the sounding at any given timing or a predetermined timing prior to carrying out DL-MU-MIMO (S101). The example of the sequence of the sounding is as illustrated in FIG. 4. The sounding may be carried out for all terminals that have the DL-MU-MIMO capability from among the terminals that belong to the access point itself, or may only be carried out for the terminals eligible for DL-MU-MIMO transmission. Here, the terminals 1 to 4 are eligible for the DL-MU-MIMO transmission, and the access point carries out sounding with the terminals 1 to 4 and obtains the respective pieces of channel information from these terminals.

Also, the access point determines the transmission rates of the data frames to be transmitted to the terminals 1 to 4 by DL-MU-MIMO (S102). As an example of the transmission rate, MCS (Modulation and Coding Scheme) can be used. MCS defines the transmission rate by a set of a modulation scheme and a code rate. For example, the modulation scheme may be 16QAM while the code rate may be 3/4 MCS, and the modulation scheme may be QPSK while the code rate may be 1/3 MCS.

The terminals have their respective applicable sets of MCSs, which are known to the access point. An MCS set includes a plurality of MCSs applicable to a terminal. The information of the MCS sets may be obtained from the terminal at the time of or after carrying out an association process with the terminals or may be determined by the access point in accordance with the capability of the terminals identified by the access point. It is assumed here that the same MCS set is applicable to the individual terminals. Meanwhile, MCS sets that are different from each other may be used for the respective terminals. Here, by way of example, the MCS set includes 8 MCSs. The individual elements (MCSs) are distinguished from each other as MCS0, MCS1, MCS2, MCS3, MCS4, MCS5, MCS6, MCS7, and MCS8. These MCSs may be those described by the same or similar notation as defined by IEEE802.11 or may be defined independently of it. It is assumed that MCS8 has the highest transmission rate and the transmission rates of the MCSs of MCS7, MCS6, and so forth become lower in this order. More than 9 MCSs may be defined.

The access point determines an initial MCS from the MCS set for each of the terminals 1 to 4. It is assumed here that the MCS having the highest transmission rate (i.e., MCS8) is commonly selected for all of the terminals 1 to 4 as the initial MCS. Meanwhile, different initial MCSs may be determined on a per-terminal basis.

The access point modulates, on the basis of the initial MCS, the data frames to be transmitted to the terminals 1 to 4 and transmits the modulated data frames by DL-MU-MIMO transmission with the beamforming based on the channel information of the terminals 1 to 4 (S102). It should be noted that the MCS of the physical header added to the frame may or should be determined independently of the MCS of the frame. Meanwhile, the MCS identical to that of the frame may be used except for a field or fields for which a fixed MCS have to be used.

After transmission of the data frame by DL-MU-MIMO, the access point waits for reception of the acknowledgement response frames from the terminals 1 to 4. If the transmitted data frame is not an aggregation frame, the access point waits for reception of an ACK frame as the acknowledgement response frame.

When the ACK frame was successfully received, it is determined that the transmission of the data frame was successful. When the ACK frame was not successfully received, then it is determined that the transmission of the data frame to the terminal was not successful. Unsuccessful transmission of a data frame may include a case where an error has been detected by checking of the data frame by the terminal, and a case where the data frame as such was not received by the terminal.

If the transmitted data frame is an aggregation frame, the access point waits for reception of a BA frame. When the BA frame has been successfully received, then the access point analyzes a bitmap stored in the predetermined field of the BA frame (BlockAck Bitmap field) and determines whether or not the transmission of the individual sub-frames (the data frames) included in the aggregation frame was successful. The bitmap provides bit representation of the check results (CRC results) for each sub-frame.

The access point determines whether or not the communication qualities of the channels of the respective terminals satisfy a criterion on the basis of whether or not the acknowledgement response frames were successfully received from the terminals 1 to 4 (in addition to which, in the case of the BA frame, on the basis of the check result of the respective sub-frames indicated by the bitmap) (S103).

In other words, the access point determines whether or not the degradation of SINR, SNR, or the like due to channel aging is of a permissible level. The details of determination regarding whether or not the criterion is satisfied will be described later.

When the criterion is satisfied by all of the terminals 1 to 4, the current MCSs of the individual terminals are maintained, and the next-round DL-MU-MIMO is executed with these MCSs. Specifically, data frames for the next-round DL-MU-MIMO transmission are modulated in accordance with these MCSs and transmitted to the terminals 1 to 4 by DL-MU-MIMO transmission (S104). The channel information (weight) used in the beamforming is the same as that of the previous round. The access point waits for reception of the acknowledgement response frames from the terminals 1 to 4 and it is determined in the same or similar manner as described above whether or not the communication qualities of the respective terminals satisfy the criterion (S103). The steps S104 and S103 are repeated as long as all of the terminals satisfy the communication quality. When, in the course of the repetition, transmission of all of pieces of data that should be transmitted to the terminals 1 to 4 has been completed, the processing of this flow is completed.

When at least one terminal among the terminals 1 to 4 fails to satisfy the criterion, then the current MCS of this terminal is compared with an MCS having a predefined reference rate (hereinafter referred to as "reference MCS"). In this embodiment, it is determined whether the current MCS of this terminal agrees with the reference MCS or lower than that (S105). The reference MCS is an MCS that is selected from a plurality of MCSs. The reference MCS is an MCS that is lower than the initial MCS and higher than the MCS having the lowest transmission rate (MCS0). By way of example, the reference MCS may be MCS3, MCS2, MCS1, or the like. An MCS other than those mentioned may be defined as the reference MCS. Although it is assumed here that the reference MCS is one single value equally applicable to the terminals 1 to 4, it is also possible to adopt MCSs different from each other for the respective terminals as the reference MCS. It should also be noted that it is not always necessary that the reference MCS be included in the MCS set supported by the terminals.

When the current MCS is higher than the reference MCS, then the access point lowers the current MCS (S106). For example, the access point updates the MCS such that the MCS to be applied is replaced by an MCS that is lower by a predetermined stage than the current MCS. For example, if the current MCS is MCS8, then the MCS7 that is lower by one stage than MCS8 is selected. With regard to the terminals that satisfy the criterion, the current MCSs are maintained on an as-is basis. As another example, when the same MCS is applied to all the terminals, another configuration is also possible according to which the MCSs for the terminals that satisfy the criterion are also lowered so as to be replaced by the above updated and lowered MCS for the terminal that did not satisfy the criterion.

The access point modulates the data frames for the next-round DL-MU-MIMO transmission in accordance with the updated MCS with regard to the terminal that did not satisfy the criterion, modulates the data frames by the current MCS with regard to the remaining terminals, and transmits the data frames to the terminals 1 to 4 by DL-MU-MIMO transmission (S106). The channel information (weight) used in the beamforming is the same as that of the previous round.

The access point waits for reception of the acknowledgement response frames from the terminals 1 to 4, and determines in the same or similar manner as described above whether or not the communication qualities of the channels of the respective terminals satisfy the criterion (S103). When all the terminals satisfy the criterion, then the process goes to the step S104 as has been described above and otherwise goes to the step S105.

Meanwhile, when it has been determined in the step S105 that the current MCS agrees with the reference MCS or is lower than the reference MCS, the access point carries out sounding (see FIG. 4) (S107). For example, this step is performed if the current MCS of the terminal that did not satisfy the criterion is MCS3 and the reference MCS is also MCS3. This step is also performed if the current MCS of the terminal is lower than the reference MCS (e.g., the current MCS is MCS2).

Sounding is carried out, by way of example, for all of the terminals 1 to 4. If the criterion is not satisfied by at least one terminal with an MCS identical to or lower than the reference MCS, then the SINR and the like are thought to have degraded in other terminals as well due to increase in the channel interference or the like over time (see FIG. 7). As a result, communication by high MCSs can be realized by carrying out the sounding for all the terminals and updating the channel matrix. By virtue of this, improvement of the overall throughput is achieved although the system overhead increases.

As another example, the sounding may only be carried out for the relevant terminals. The advantage of this case is that the system overhead can be reduced. This approach can be effective in a case where the criterion is not satisfied due to a cause specific to this terminal while other terminals are capable of normally making communications using high MCSs (for example, the initial MCS), or in any similar cases.

The MCS used in DL-MU-MIMO carried out after the sounding is restored, by way of example, to the initial MCS. Meanwhile, the MCS to which the MCS is to be restored does not always need to be the initial MCS as long as the MCS is restored to an MCS higher than the previously used MCS.

Also, the combination of the terminals may be modified as appropriate in accordance with the communication qualities of the individual terminals such as SINR, the data size of the data stored in the buffer of each terminal, and the like. The combination of the terminals may also be modified at the timing at which the MCS is lowered in any one of the terminals, at a timing at which any one of the terminals fails to satisfy the reference MCS, or at a timing at which the sounding is performed, or the like, where these timing are used as a trigger to modify the combination of the terminals.

In this manner, in the processes of the steps S105 and S106, degradation of the channel quality to the extent that communications can be performed with a transmission rate equal to or larger than the reference MCS is handled by lowering the MCS and the sounding is not carried out. By virtue of this, increase in the overhead due to excessive rounds of sounding is suppressed. Meanwhile, in a case of degradation where proper communications cannot be made unless an MCS lower than the reference MCS is applied (YES in S105), the channel information is re-acquired by the sounding and the channel matrix is updated. This approach is considered as being more effective because it can increase the overall communication efficiency.

Here, the determination of whether or not the communication quality of the channel satisfies the criterion, which is performed in the step S103, is described in detail below.

As a first example, when the acknowledgement response frames (ACK frame, etc.) were not successfully received for a consecutive $\alpha 1$ times, then it is determined that the communication quality of the channel of this terminal does not satisfy the criterion. If the acknowledgement response frame is a BA frame, it is determined that the criterion is not satisfied when a check result of the consecutive at least "$\alpha 2$" (for example, one) sub-frames results in "unsuccessful" (NG), or when the check results of the sub-frames results in "unsuccessful" with a probability of "$\alpha 3$" or more (alternatively, a case where the BA frame was not successfully received may also be recognized as the case resulting in the failure to satisfy the criterion). The "$\alpha 2$" may be one or a greater number. The "$\alpha 3$" may be 100% (all the sub-frames included in one BA frame) or may be other values such as 50%.

As a second example, if a probability of the terminal having failed in reception of the frame is $\beta 1\%$ or more, then it is determined that the communication quality of the channel of this terminal does not satisfy the criterion. This probability corresponds to a probability of the result of the frame check having resulted in NG, i.e., a packet error rate. If the acknowledgement response frame is the ACK frame, the probability of the terminal having failed in the reception of the frame corresponds to the probability of the reception of the ACK frame having been unsuccessful.

In the case of the BA frame, the probability of the terminal having failed in the reception of the frame corresponds to a probability of reception of a BA frame having at least $\alpha 2$ (for example, one) sub-frames whose check result indicates "unsuccessful" or a BA frame having sub-frames whose check result indicates "unsuccessful" with a probability of $\alpha 3$ or more (a case where the BA frame was not successfully received may also be recognized as the case resulting in the failure to receive the frame).

Alternatively, the probability of the terminal having failed in the reception of the frame may be a total number of the unsuccessful bits with respect to a total number of the bits of the respective bitmaps of the entire BA frames (with regard to the BA frames that were not successfully received, it may be regarded as all the bits of the bitmap were unsuccessful).

The probability of the terminal having failed in the reception of the frame may be calculated for a time period having a certain length ($\beta 2$). Alternatively, the probability may be calculated for a predefined number of times ($\beta 3$) with regard to the number of times of transmission to the terminals (the number of rounds of the DL-MU-MIMO transmission). Methods other than those described herein may be used in the calculation.

It should be noted that the following method can be additionally used as the method of determination of whether or not the communication qualities of the channels satisfy the criterion. For example, at the time of demodulation of the frame that has been received by the terminal by DL-MU-MIMO, reception quality such as SNR and EVM (Error Vector Magnitude) is measured, and the information of the reception quality is included in the acknowledgement response frame. Even if the reception of the acknowledgement response frame was successful, the access point makes a count, regarding that the transmission of the data frame was unsuccessful, when the reception quality is equal to or lower than a threshold (or equal to or larger than the threshold). By virtue of this, any sign of degradation is detected before occurrence of actual failure in transmission of the data frames, and the MCS is lowered or the sounding is carried out at an appropriate timing. By virtue of this, increase in the throughput can be expected. It should be noted that the information of the reception quality may be specified in a reserved area of the acknowledgement response frame, or a frame format having a filed for specifying the information therein may be defined.

The method of determining the reference MCS used in the step S105 is described in detail below.

Figure 9:
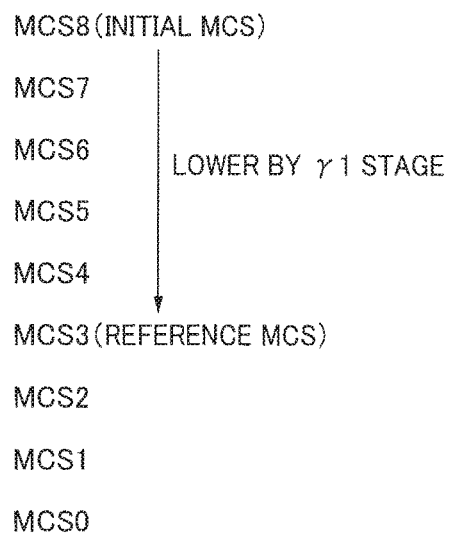
FIG. 9 is an additional explanatory diagram of the operation of the access point.

As a first example, an MCS that is lower by "γ1" stages than the initial MCS may be determined as the reference MCS. For example, if MCS8 is the initial MCS and γ1 is 5, then MCS3 (=8−5) is determined as the reference MCS. This example is schematically illustrated in FIG. 9.

Also, the value of "γ1" may be made larger corresponding to a higher initial MCS. For example, "γ1" may be 5 if the MCS8 is the initial MCS, and "γ1" may be 3 if the MCS6 is the initial MCS. This is because a higher MCS is associated with a higher probability of unsuccessful frame transmission (higher packet error rate) and the quality of the channel is likely to be still sufficiently high even when the rank of the MCS is lowered more or less. The value of "γ1" may be the same for all of the terminals 1 to 4 or may be determined independently on a per-terminal basis.

As a second example, a predefined fixed MCS may be defined as the reference MCS. The fixed MCS may be the one that is defined in accordance with the standard or the specification, or the one that is autonomously determined by the system, or the one that is specified by the system user.

Here, the values of the above-described parameters α1, α2, α3, β1, β2, β3, and γ1 may be determined in accordance with a user multiplex number. Since a larger user multiplex number tends to cause higher influence of the interferences among the users, the parameter values are specified such that a larger multiplex number requires an earlier sounding timing (earlier transmission timing of the channel estimation frame).

Specifically, a larger user multiplex number requires a smaller α1, α2, or α3. A larger user multiplex number requires a larger β1. Also, a larger user multiplex number requires smaller β2 or β3. Also, a larger user multiplex number requires a smaller value of γ1.

Also, the values of the above-described parameters α1, α2, α3, β1, β2, β3, and γ1 may be modified depending on the statuses of reception of the acknowledgement response frames in response to the data frames transmitted by the user multiplexed transmission in the step S102. The number of terminals (number of users) from which the acknowledgement response frames were not successfully received is counted, and the control is carried out such that a larger number of rounds of unsuccessful reception from a predetermined number of the terminals or more (for example, all the terminals) leads to a later sounding timing (later transmission timing of the channel estimation frame). This mode of control is carried out because the possibility of the frame error caused by frame collision due to so-called hidden nodes and interference noise from proximate devices (microwave oven, etc.) is higher than the frame error due to degradation of SINR, SNR, etc. associated with the channel variations.

Specifically, a larger number of times of unsuccessful reception from a predetermined number of terminals or more requires a larger α1, α2, or α3. A larger number of times of unsuccessful reception from a predetermined number of terminals or more requires a smaller β1. Alternatively, the larger number of times requires a larger β2 or β3. Also, the larger number of times requires a larger value of γ1.

It should be noted that, if the acknowledgement response frame is a BA frame, unsuccessful reception of the acknowledgement response frame many refer to a case where check results of at least a predetermined number (for example, one) of its sub-frames result in "unsuccessful" (NG) or a case where the check result indicate "unsuccessful" with a predetermined probability or a probability higher than that in addition to a case where the BA frame was not successfully received.

In the flowchart of FIG. 8, when the criterion is not satisfied in at least one terminal among the terminals 1 to 4 in the step S103, the process goes to the step S103. However, the process may go to the step S103 when the criterion is not satisfied in two or more terminals and otherwise to the step S104. In this case, the current MCS is also maintained with regard to the terminal that does not satisfy the criterion. Nevertheless, there may be cases where higher overall throughput can be achieved if the other terminals have high MCSs.

As another example, if the criterion is not satisfied in terminals of lower than a predetermined number, the process may go to the step S104 only when the MCSs of the other terminals have a predetermined value or larger than that. When the terminals of the number less than the predetermined number do not satisfy the criterion and the MCSs of the other terminals are lower than the predetermined value, then the process goes to the step S103.

As the initial MCS of the terminals in the step S102, amongst the MCSs supported by the terminals, the highest MCS or a predefined MCS is used. As another example, the SNR (Signal to Noise Ratio), etc. may be measured on a per-terminal basis and the MCS may be selected in accordance with the SNR. Specifically, if the SNR is high, then a high MCS is selected. Instead of SNR, other reception quality indicators such as RSSI may be used. The SNR, etc. of the terminals may be obtained as a response to transmission of a frame requesting the terminals to provide feedback of the SNR. When the channel is regarded as being bi-directionally symmetrical between a transmitter and a receiver, then an SNR measured by the access point on the basis of the signal received from the terminal may be used.

The maximum value of the time of the sounding interval may be provided in advance. When the conditions for carrying out the sounding have not been established and the time equal to the maximum value has elapsed, then the sounding may be carried out.

Also, there may be a case where the access point has a limit (retry limit) to the number of times of re-transmission to be carried out when transmission to the terminal was not successful. The retry limit is, by way of example, 4 times, 7 times, or the like. When the transmission is not successful even if the retry limit is reached, transmission of this frame is abandoned and the processing should be overtaken by an upper-layer protocol. It is also possible to modify the above-described parameters in accordance with the size of the retry limit.

Specifically, it should be ensured that a larger retry limit necessitates a later sounding timing, and a lower retry limit necessitates an earlier sounding timing. The specific method of modifying the parameters is the same as the above-described method. In the case of the lower retry limit, there is a considerable constraint to the number of times of permissible re-transmission. Accordingly, it is desirable that the sounding is made to take place earlier in order to raise the possibility of reliably transmitting the frames (in other words, the sounding is carried out again during the re-transmission period). Meanwhile, in the case of the larger retry limit, there are many chances to carry out the re-transmission. Accordingly, the sounding is made to take place as late as possible and the MCS is lowered so that the frame transmission is successfully carried out.

FIG. 10(A) illustrates a specific example of the operation illustrated in FIG. 8. The MCS8 is the initial MCS and the MCS3 is the reference MCS. The MCS is lowered by one stage every time it is determined that the communication quality does not satisfy the criterion (NO in S103, NO in S105, and S106 of FIG. 8). When it has been determined that the current MCS is MCS3 and the criterion is not satisfied (YES in S105), this means that the MCS has reached the reference MCS, so that the sounding is carried out without lowering the MCS (S107). The MCS used in the DL-MU-MIMO after the sounding is restored to the initial MCS (MCS8).

Meanwhile, a destination MCS to which the MCS should be restored is not limited to the initial MCS. FIG. 10(B) illustrates an example of this case. For example, when the communications are carried out with each one of the MCS8, MCS7, MCS6, MCS4, and MCS3, the packet error rate or the like may be measured, and an MCS whose packet error rate exceeds a threshold may be disqualified as a restoration destination MCS. In the example of FIG. 10(B), since the packet error rate of MCS8 is high, MCS7 which is lower by one stage than MCS8 is specified as the restoration destination MCS.

Figure 10:
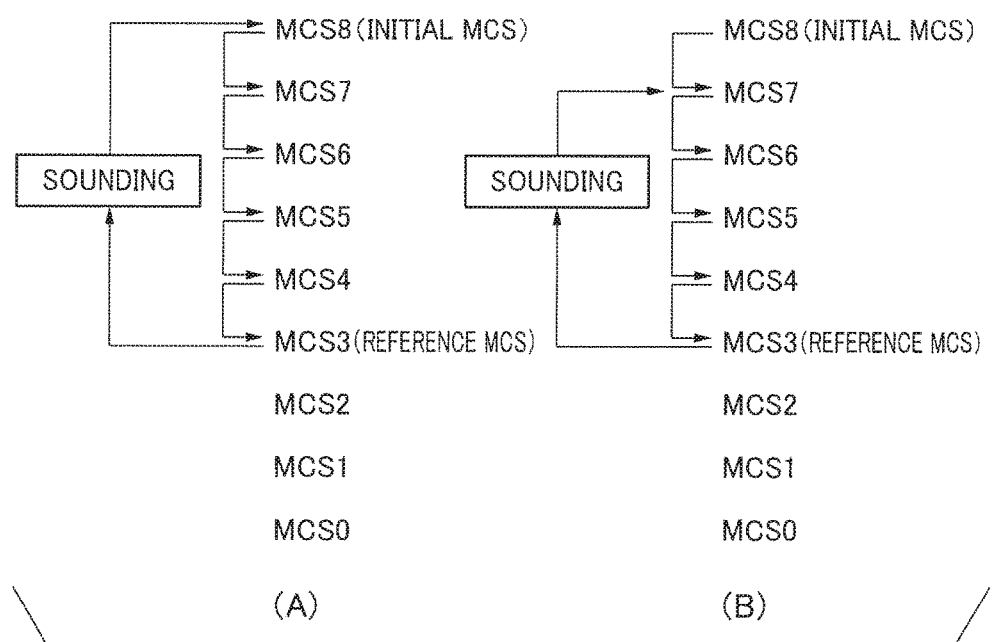
FIG. 10 is an additional explanatory diagram of the operation of the access point.

FIG. 11(A) illustrates another specific example of the operation illustrated in FIG. 8. FIG. 10 presupposes a case where the terminals support all of MCS8 to MCS0. In FIG. 11(A), a terminal supports only part of MCS8 to MCS0. In this example, the MCSs supported by the terminal include MCS7, MCS5, MCS3, MCS1, and MCS0. The shaded MCSs are those that are not supported by the terminal. Also, the reference MCS, which is MCS2 in this example, is an MCS that is not supported by the terminal. The initial MCS of the terminal is MCS7. When it has been determined that the communication quality does not satisfy the criterion, the MCS of the terminal is changed to MCS5 which is an MCS lower by one stage than MCS7. When it has been determined that the criterion is not satisfied with the MCS5, the MCS applied to the terminal is changed to MCS3. When it has been determined that the criterion is not satisfied with the MCS3, the MCS to be applied to the terminal is changed to the MCS1. When it has been determined that the criterion is not satisfied with the MCS1, sounding is carried out without lowering the MCS anymore because the MCS1 is lower than the reference MCS (MCS2) (S107). In addition, the MCS is restored to the initial MCS or the like. The restoration destination of the MCS is not limited to the initial MCS.

In the example of FIG. 11(A), it is determined that the criterion is not satisfied when the current MCS is an MCS lower than the reference MCS and the sounding is carried out. As another example, the sounding may be carried out without lowering the MCS anymore when it has been determined that the criterion is not satisfied while the current MCS is the MCS3 which is higher than the reference MCS. An example of this case is illustrated in FIG. 11(B). When it has been determined that the criterion is not satisfied while the current MCS is MCS3, the sounding is carried out without lowering the MCS, and the MCS is restored to the initial MCS or the like. The MCS that is lower by one stage and is applicable to the next terminal following the current MCS is MCS1, which is lower than the reference MCS (MCS2). Accordingly, according to this operation, it is made possible to prevent DL-MU-MIMO from being carried out with an MCS that is lower than the reference MCS. It should be noted that the restoration destination of the MCS is not limited to the initial MCS as described above.

Figure 11:
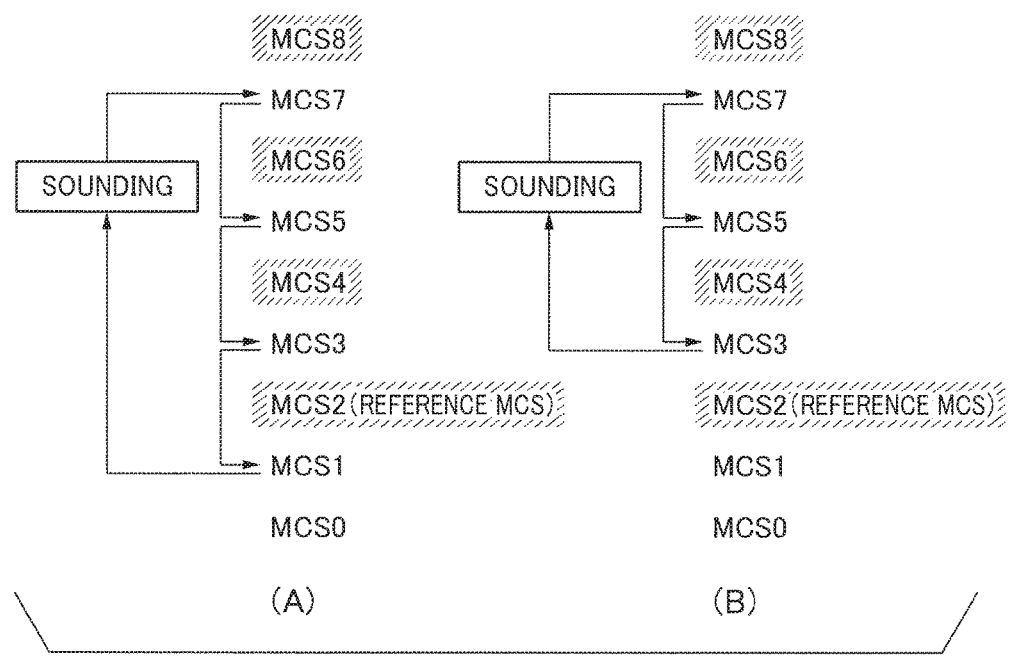
FIG. 11 is an additional explanatory diagram of the operation of the access point.
Figure 12:
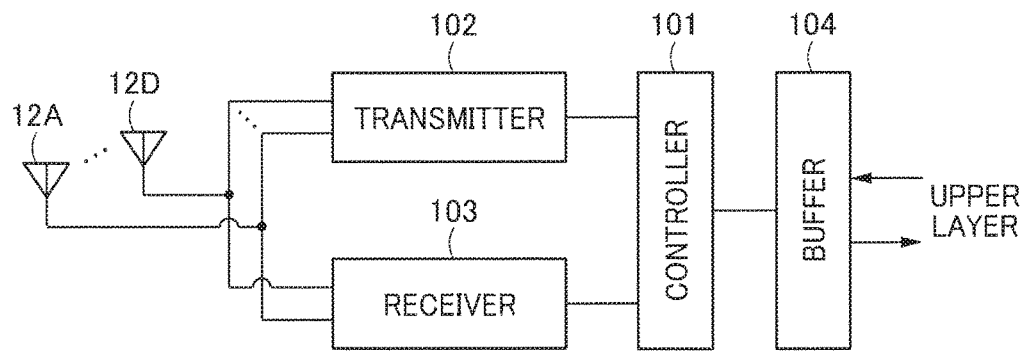
FIG. 12 is a functional block diagram of a wireless communication device incorporated in the access point.

FIG. 12 is a functional block diagram of a wireless communication device incorporated in the access point 11. As described above, the access point 11 is connected at least to the network to which the terminals 1 to 6 illustrated in FIG. 1 belong, and can further be connected to another network different from the former network. FIG. 11 illustrates a configuration of a wireless communication device connected to the network to which the terminals 1 to 6 belong.

The wireless communication device in the access point 11 includes antennas 12A, 12B, 12C and 12D, a controller 101, a transmitter 102, a receiver 103, and a buffer 104. The number of the antennas is four although the number may be one or more. The controller 101 corresponds to controlling circuitry or a baseband integrated circuit which controls communication with the terminals, and the transmitter 102 and the receiver 103 form a wireless communicator or an RF integrated circuit which transmits and receives frames via the antenna as an example. A process of the controller 101, and all or a part of a digital region process of the transmitter 102 and the receiver 103, or a process of the communication control device may be performed by software (program) executing on a processor such as a CPU, or may be performed by hardware, or may be performed by the both of these software and hardware. The access point may include a processor performing the process of the controller 101, all or a part of the transmitter 102 and the receiver 103.

The buffer 104 is a storage for transferring a frame, data or the like between an upper layer and the controller 101. The buffer 104 may be a volatile memory such as a DRAM or a non-volatile memory such as a NAND, or an MRAM.

The upper layer may store the frame received from another network in the buffer 104 for relaying to the network in the terminal side, or takes in, from the controller 101, the frame received from the network or a payload thereof via the buffer 104. The upper layer may perform an upper communication process than a MAC layer such as a TCP/IP or a UDP/IP. Alternatively, the TCP/IP or a UDP/IP may be performed in the controller 101 and the upper layer may also perform a process of an application layer of processing the data upper than the TCP/IP or the UDP/IP. An operation of the upper layer may be performed by software (program) processing by a processor such as a CPU, or may be performed by hardware, or may be performed by the both of the software and the hardware.

The controller 101 mainly performs a process of the MAC layer, a part of a process of a physical layer. The controller 101 transmits and receives the frame (more specifically, a physical packet having a physical header added to the frame) via the transmitter 102 and the receiver 103 to control the communication with the terminals. The controller 101 may also control so as to periodically transmit a beacon frame for notifying attribute information and synchronization information etc. on BSS (Basic Service Set) of the access point. The controller 101 may include a clock generator generating a clock. Additionally, the controller 101 may be configured to receive the clock externally input. The controller 101 may manage an internal time using the clock generated by the clock generator or the clock externally input, or the both of these. The controller 101 may output externally the clock created by the clock generator.

The controller 101, on receiving an association request from the terminal, performs an association process to exchange required information on capability or an attribute etc. each other and establishes the wireless link with the terminal. The required information may include capability information indicative of whether or not multi-user transmission scheme such as DL-MU-MIMO can be implemented.

The controller 101 periodically checks the buffer 104 to confirm the state of the buffer 104 such as existence or non-existence of data for downlink transmission. Alternatively, the controller 101 may check the state of the buffer 104 according to a trigger given from an external device as such the buffer 104.

The controller 101 may obtain the information of the MCS set including MCSs that are achievable by the terminals in or after the association process. The controller 101 may obtain the information of the MCS set in response to a request made by the access point or may obtain the information of the MCS set that is spontaneously transmitted from the terminals. The information of the MCS set may be identification information identifying the MCS set. Alternatively, the information of the MCS set may be a list of identification information identifying the individual MCSs included in the MCS set.

When DL-MU-MIMO is to be carried out, the controller 101 carries out sounding in advance and obtains the channel information from the eligible terminals. Specifically, the controller 101 transmits the channel estimation frames and receives the report frames that include the channel information from the respective terminals. The example of the sequence of the sounding is as has been illustrated in the above-described FIG. 4.

When the controller 101 determines to start DL-MU-MIMO, the controller 101 selects the terminals eligible for DL-MU-MIMO. The terminals eligible for DL-MU-MIMO should be selected by the above-described methods as appropriate such as selecting the terminals having the same or similar data length. Also, selection of the terminal may be modified as appropriate in accordance with the communication quality of the individual terminals such as SINR and the status of the buffer 104 or the like. Also, the combination of the terminals may also be modified at the timing at which the MCS is lowered in any one of the terminals or at a timing at which any one of the terminals fails to satisfy the reference MCS, or at a timing at which the sounding is performed, or the like, where these timing are used as an appropriate trigger to modify the combination of the terminals. The controller 101 determines the initial MCSs of the terminals, respectively. The controller 101 modulates the frames addressed to the selected terminal (for example, the data frames) and carries out DL-MU-MIMO transmission on the basis of the initial MCSs and on the basis of the channel information of the individual terminals. It should be noted that the receiver address of the MAC header of the frame is the MAC address of the terminal. The transmitter address is the MAC address of the access point (BSSID). An MCS determined independently of the MCS of the frame may or should be used for the physical header to be added to the frame. Meanwhile, it is also possible that the MCS identical to that of the frame may be used except for a field or fields for which a fixed MCS has to be used among the individual fields of the physical header.

The controller 101, when transmitting the frame (more specifically, the physical packet having the physical header added to the frame), as an example, performs the carrier sensing in accordance with the CSMA/CA before the transmission, and if a carrier sensing result shows being idle (if a value of the CCA is equal to or less than a threshold), the access right to the wireless medium is acquired. The controller 101 subjects the frame to processes such as encode and a modulation process (which may include MIMO modulation) based on the MCS to output to the transmitter 102. The transmitter 102 subjects the input frame (more specifically, the physical packet having the physical header added thereto) to DA conversion, a filtering process to extract components of a desired band, frequency conversion (up-conversion) and the like to amplify signals obtained through these processes by a pre-amplifier and radiate the amplified signals as radio waves from the plural antennas into the space. In the case of single-user transmission, the same signal may be simultaneously transmitted by performing processing of the physical layer for each transmission channel corresponding to each antenna, or may be transmitted using only one transmission channel. It is also possible to control the directionality of the transmission using multiple antennas.

The signal received by each antenna in the access point is processed in the receiver 103 for each reception system corresponding to the each antenna. The received signal of each antenna is amplified by a low noise amplifier (LNA) in the corresponding reception system, is subjected to frequency conversion (down-convert), and is subjected to a filtering process, thereby allowing a desired band component to be extracted. Each extracted signal is further converted into a digital signal through AD conversion and a resultant packet is input to the controller 101. The signals in the reception systems are synthesized by a diversity technique to acquire the packet. Alternatively, it is also possible to carry out reception with a configuration according to which only one antenna is connected to the receiver 103 and the remaining antennas are not connected to the receiver 103.

The controller 101 subjects the received packet to processes such as demodulation and error-correcting decode to acquire the frame to carry out CRC check of the frame (in a case of the aggregation frame, the CRC check is carried out for the plural data frames in the aggregation frame). The controller 101 transmits the acknowledgement response frame (more specifically, the packet having the physical header added thereto) after elapse of a predefined time period from the completion of receiving the frame from the terminal. In a case where the frame is the aggregation frame, the acknowledgement response frame is the BA frame. The transmitter 102 subjects the acknowledgement response frame to DA conversion, a filtering process to extract components of a desired band, frequency conversion (up-conversion) and the like to amplify signals obtained through these processes by a pre-amplifier and radiate the amplified signals as radio waves from the plural antennas into the space.

The controller 101 measures the communication qualities of the channels with the individual terminals on the basis of the responses to the data frames transmitted by the DL-MU-MIMO transmission, and either maintains the current MCS or carries out the sounding and re-acquire the channel information in accordance with whether or not the criterion is satisfied (see the steps S103 to S107 of FIG. 7). After acquisition of the channel information, the MCS is modified to be the one that is higher than the current MCS for example by restoring the MCS to the initial MCS. It should be noted that a predefined MCS may or should be used for the frame for channel estimation used in the sounding.

The controller 101 may access a storage for storing the information to be transmitted via the frame to the terminal or the information received from the terminal, or the both of these to read out the information. The storage may be a buffer included in the controller 101 (internal memory) or a buffer provided outside the controller 101 (external memory). The storage may be a volatile memory or a non-volatile memory. The storage may also be an SSD, a hard disk or the like other than the memory.

The above described isolation of the processes of the controller 101 and the transmitter 102 is an example, and another form may be used. For example, the controller 101 may perform the process until the digital region process and the DA conversion, and the transmitter 102 may perform the process subsequent to the DA conversion. As for the isolation of the processes of the controller 101 and the receiver 103, similarly, the receiver 103 may perform the process before the AD conversion and the controller 101 may perform the digital region process including processes following the AD conversion.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Figure 13:
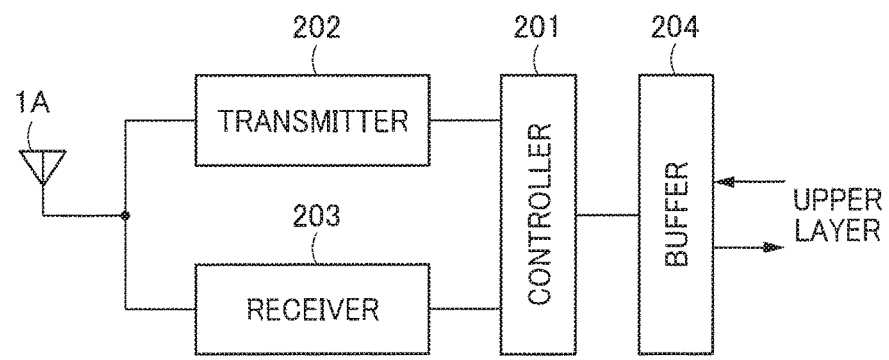
FIG. 13 is a functional block diagram of a wireless communication device incorporated in the terminal.

FIG. 13 is a functional block diagram of the wireless communication device incorporated in the terminal. In this example, although an example of the configuration of the terminal 1 is illustrated, any one of the respective wireless communications devices incorporated in the respective terminals 2 to 6 illustrated in FIG. 1 has the configuration illustrated in FIG. 13.

The wireless communication device includes a controller 201, a transmitter 202, a receiver 203, at least one antenna 1, and a buffer 204. The controller 201 corresponds to controlling circuitry or a baseband integrated circuit which controls communication with the access point 11, and the transmitter 202 and the receiver 203 form a wireless communicator or an RF integrated circuit which transmits and receives frames as an example. A process of the controller 201, and all or a part of a digital region process of the transmitter 202 and the receiver 203 may be performed by software (program) executing on a processor such as a CPU, or may be performed by hardware, or may be performed by the both of the software and the hardware. The terminal may include a processor performing the process of the controller 201, all or a part of the transmitter 202 and the receiver 103.

The buffer 204 is a storage for transferring a frame, data or the like between an upper layer and the controller 201. The buffer 204 may be a volatile memory such as a DRAM or a non-volatile memory such as a NAND, or an MRAM.

The upper layer generates the frames or data to be transmitted to other terminals, the access point 11, or a device on another network such as a server and stores the generated frames in the buffer 204, or takes in, via the buffer 204, the frame or the payload thereof received from other terminals, the access point, or a device on another network such as a server. The upper layer may perform an upper communication process than a MAC layer such as a TCP/IP or a UDP/IP. The TCP/IP or the UDP/IP may be performed in the controller 201 and the upper layer may perform a process of an application layer of processing the data upper than the TCP/IP or the UDP/IP. A process of the upper layer may be performed by software (program) executing on a processor such as a CPU, or may be performed by hardware, or may be performed by the both of these software and hardware.

The controller 201 mainly performs a process of the MAC layer. The controller 201 transmits and receives the frames via the transmitter 202 and the receiver 203 to and from the access point 11 to control the communication with the access point 11. The controller 201 may include a clock generator generating a clock. Additionally, the controller 201 may be configured to receive the clock externally input. The controller 201 may manage an internal time using the clock generated by the clock generator or the clock externally input. The controller 201 may output externally the clock created by the clock generator.

The controller 201, as an example, receives the beacon frame to detect the attribute and synchronization information of BSS of the access point 11 and then transmits an association request to the access point 11 to perform an association process in response to the received beacon. Thereby, the control 201 exchanges required information on capability or an attribute etc. each other and establishes the wireless link with the access point 11. The required information may include capability information of whether the access point or the terminal is compliant with DL-MU-MIMO.

Also, the controller 201 may notify the information of the MCS set including the MCSs that are achievable by the terminal itself in or after the association process. The controller 201 may notify the information of the MCS set in response to reception of a request from the access point or may transmit the information of the MCS set spontaneously. The information of the MCS set may be identification information identifying the MCS set. Alternatively, the information of the MCS set may be a list of identification information identifying the individual MCSs included in the MCS set.

There may be a case where an MCS that acts as the basis for some of the MCSs that are achievable by the access point needs to be included in the terminal belonging to the BSS of the access point. In this case, a terminal that cannot use this MCS cannot belong to the BSS of this access point.

The controller 201 periodically checks the buffer 204 to detect a state of the buffer 204 such as whether or not the data exists to be transmitted by way of the uplink transmission. Alternatively, the controller 201 checks the state of the buffer 204 by a trigger from the external such as the buffer 204 or the like. Once the controller 201 confirms the existence of the data in the buffer 204, it may transmit, after acquiring the access right to the wireless medium (transmission right) in accordance with the CSMA/CA or the like, the frame containing the relevant data (more specifically, the physical packet having the physical header added thereto) via the transmitter 202 and the antenna 1. It should be noted that the acquisition of the access right may be performed by transmitting an RTS frame to the access point and receiving a CTS frame.

The transmitter 202 subjects the frame input from the controller 201 to DA conversion, a filtering process to extract components of a desired band, frequency conversion (up-conversion) and the like to amplify signals obtained through these processes by a pre-amplifier and radiate the amplified signals as radio waves from one or more antennas into the space. When multiple antennas are provided, the same signal may be simultaneously transmitted from the antennas. Alternatively, it is also possible to control the transmission directionality using multiple antennas.

The signal received by the antenna 1 is processed in the receiver 203. The received signal is amplified in the receiver 203 by the LNA, subjected to frequency conversion (down-conversion) and a filtering process to extract components of the desired band. The extracted signals are further converted into digital signals through AD conversion and output to the controller 201. The controller 201 performs demodulation, error-correcting decode, and a process of the physical header, and thereby the frame are such as the data frame (including the frame received by way of the DL-MU-MIMO) are acquired. If a receiver address (Address 1) of the MAC header of the frame matches the MAC address of the terminal of itself, the relevant frame is processed as the frame directed to the terminal of itself. If not match, the relevant frame is discarded.

The controller 201 carries out the CRC check of the received frame (in a case of the aggregation frame, the CRC check is carried out for the plural data frames in the aggregation frame). The controller 201 transmits the acknowledgement response frame via the transmitter 202 after elapse of a certain time period such as the SIFS from the completion of receiving the frame.

When the channel estimation frame has been received from the access point, the controller 201 calculates the variations in the amplitude and the phase on the basis of the reception signal of the predetermined field included in the channel estimation frame and the known signal that is already known to the controller 201. In addition, the controller 201 generates a report frame that includes channel information indicative of the calculated amplitude and phase variations and transmits the generated report frame to the access point.

If the controller 201 transmits the frame such as the data frame to the access point, it receives via the receiver 203 the acknowledgement response frame (such as the ACK frame or the BA frame) transmitted from the access point after elapse of a certain time period such as the SIFS from the completion of the transmission. The controller 201 determines whether or not the data frame (the individual aggregated data frames in a case of the aggregation frame) is successfully transmitted on the basis of the acknowledgement response frame.

The controller 201 may access a storage device that stores either information to be notified to the access point or the information notified from the access point or both of these pieces of information and read the information. The storage device may be an internal memory device, an external memory device, a volatile memory device, or a non-volatile memory. Also, the storage devices such as an SSD and a hard disk may be used in place of the memory device.

The above described isolation of the processes of the controller 201 and transmitter 202 is an example, and another form may be used. For example, the controller 201 may perform the process until the digital region process and the DA conversion, and the transmitter 202 may perform process subsequent to the DA conversion. As for the isolation of the processes of the controller 201 and the receiver 203, similarly, the receiver 203 may perform the process before the AD conversion and the controller 201 may perform the digital region process including processes following the AD conversion.

As one example, the baseband integrated circuit in accordance with this embodiment corresponds to the section that carries out the processing of digital domain, the section that carries out the processing of the DA conversion in the transmission, and the section that carries out the processing processes including and following the AD conversion in the reception. The RF integrated circuit corresponds to the section that carries out the processing processes following the DA conversion in the transmission and the section that carries out the processing processes prior to the AD conversion in the reception. The integrated circuit for the wireless communication in accordance with this embodiment includes at least a baseband integrated circuit from the baseband integrated circuit and the RF integrated circuit. The processing processes between blocks or processing processes between the baseband integrated circuit and the RF integrated circuit may be demarcated from each other in accordance with any method other than those described herein.

Modified Example 1

Although the operation has been described with reference to an example where user multiplexed transmission is performed (see FIG. 8) in this embodiment, the operation of this embodiment can also be implemented in a case where beamforming is carried out by single-user transmission. In this case, the descriptions of FIG. 8 should be read with the descriptions regarding the processing associated with the user multiplexed transmission replaced by descriptions regarding the processing associated with the single-user transmission processing.

Modified Example 2

In the above embodiment, DL-MU-MIMO is described as the user-multiplexing transmission although a down link OFDMA (Orthogonal Frequency Division Multiple Access) may be employed instead. In the OFDMA scheme, the frequency components are defined as resource units each including one or a plurality of subcarriers, and the resource units are allocated to the terminals (at least one of which may refer to an access point), and transmissions to the plurality of terminals or receptions from the plurality of terminals are simultaneously performed. The resource unit corresponds to a smallest unit of a communication resource. The transmissions to the plurality of terminals from the access point correspond to a downlink OFDMA, and transmissions from the plurality of terminals to the access point corresponds to an uplink OFDMA. A resource unit may refer to a sub-channel, a resource block or a frequency block etc.

Figure 14:
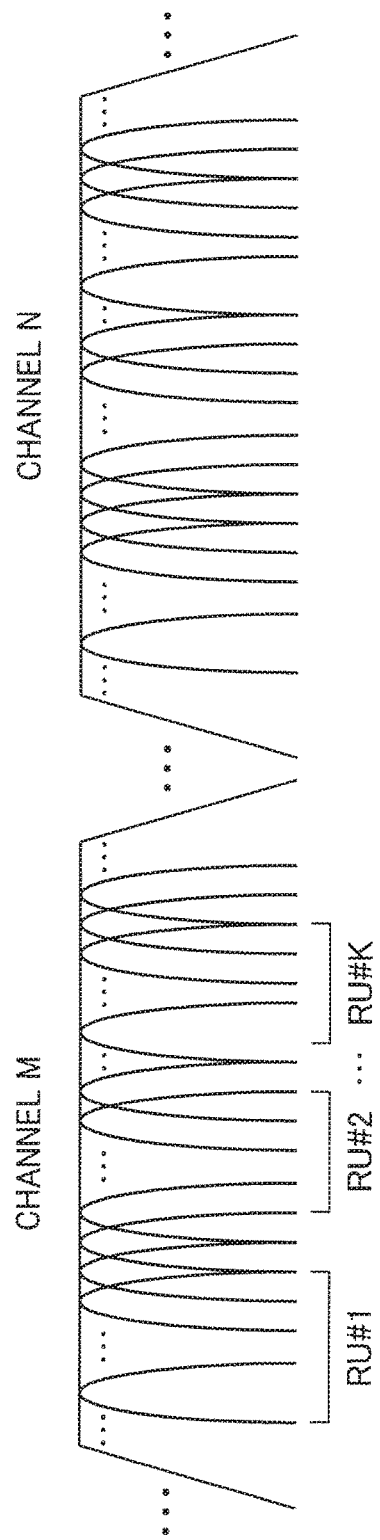
FIG. 14 is a diagram for explanation of allocation of resource units.

FIG. 14 illustrates the resource units (RU#1, RU#2 . . . RU#K) arranged within a continuous frequency domain of one channel (which is described here as the channel M). A plurality of subcarriers orthogonal to each other are arranged in the channel M, and a plurality of resource units including one or a plurality of continuous subcarriers are defined within the channel M. Although one or more subcarriers (guard subcarriers) may be arranged between the resource units, presence of the guard subcarrier is not essential. A number for identification of the subcarrier or the resource unit may be assigned to each carrier or each resource unit in the channel. The bandwidth of one channel may be for example, though not limited to these, 20 MHz, 40 MHz, 80 MHz, and 160 MHz. One channel may be constituted by combining a plurality of channels of 20 MHz. The number of subcarriers in the channel or the number of resource units may vary in accordance with the bandwidth. An OFDMA communication is realized by different resource units being simultaneously used by different terminals.

Figure 15:
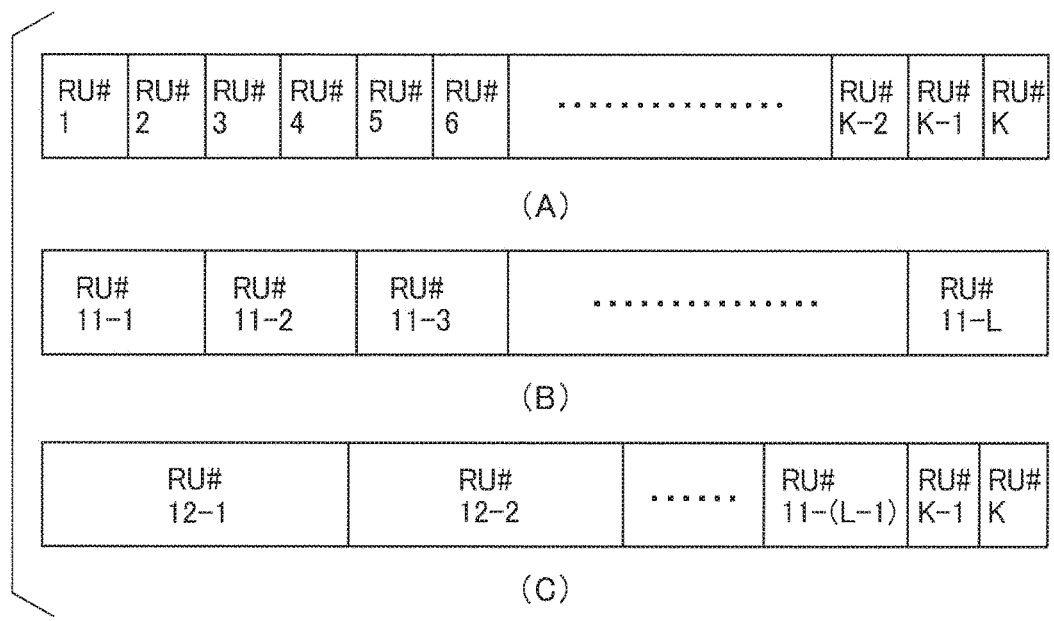
FIG. 15 is a diagram for explanation of arrangement of the resource units.

The bandwidth of the resource unit (or the number of subcarriers) may be common in the respective resource units or the bandwidth (or the number of subcarriers) may be different for each resource unit. FIG. 15 each schematically show an exemplary arrangement pattern of the resource units in one channel. A landscape orientation along a paper plane corresponds to a frequency domain direction. Each pattern is given a pattern identifier and any of the patterns may be selected by the access point. The pattern shown here is an example and other various patterns may be used. FIG. 15(A) illustrates an example where a plurality of resource units (RU#1, RU#2 . . . RU#K) having the same bandwidth are arranged, and FIG. 15(B) illustrates another example where a plurality of resource units (RU#11-1, RU#11-2 . . . RU#11-L) having a larger bandwidth than that of FIG. 15(A) are arranged. FIG. 15(C) illustrates a still another example where resource units with three types of bandwidths are arranged. The resource units (RU#12-1, RU#12-2) have the largest bandwidth, the resource unit RU#11-(L−1) has the bandwidth identical to that of FIG. 15(B), and the resource units (RU#K−1, RU#K) have the bandwidth identical to that of FIG. 15(A).

Here, the number of resource units used by each terminal is not limited to a particular value and one or a plurality of resource units may be used. When a terminal uses a plurality of resource units, a plurality of resource units that are continuous in terms of frequency may be used, and the resource units may be bonded. A plurality of resource units that are located at positions away from each other may be allowed to be used. The resource unit RU#11-1 of FIG. 15(B) may be considered as a bonded resource unit of the resource units RU#1 and RU#2 of FIG. 15(A).

It is assumed here that subcarriers within one resource unit are continuous in the frequency domain. However, resource units may be defined with use of a plurality of subcarriers that are arranged in a non-continuous manner. The channels used in OFDMA communication are not limited to one single channel but resource units may be reserved in another channel (see the channel N in FIG. 2, for example) arranged at a location away in the frequency domain from the channel M as the case of the channel M and thus the resource units in both the channel M and the channel N may be used. The same or different modes of arranging the resource units may be used for the channel M and the channel N. The bandwidth of the channel N is by way of example 20 MHz, 40 MHz, 80 MHz, 160 MHz, etc. as described above but not limited to them. It is also possible to use three or more channels. It is considered here that the combining of the channel M and the channel N may be regarded as one single channel.

As the user multiplexed transmission, a scheme may be relied on that combines DL-MU-MIMO and DL-OFDMA. According to this combined scheme, the terminals as the destinations of the transmission are sorted into a plurality of sets and one beam is generated and transmitted for the respective sets. In addition, in one beam, multiple frames for the terminals pertaining to the same set are transmitted by DL-OFDMA. In other words, a case is envisaged where the terminals pertaining to the same set exist within the domain of one beam.

Modified Example 3

In the sequence illustrated in FIG. 5, the terminals 1 to 4 transmit the BA frame by single-user transmission. As another example, the terminals 1 to 4 may transmit the BA frames by user multiplexed transmission upon the lapse of a predetermined time after completion of reception of the data frames. For example, the BA frames may be transmitted from the terminals 1 to 4 using the uplink multi-user MIMO (UL-MU-MIMO) technology. According to UL-MU-MIMO, the terminals 1 to 4 simultaneously transmit the acknowledgement response frames using the same frequency band. UL-MU-MIMO can be implemented by specifying pattern signals orthogonal to each other in the physical header of the BA frames which are transmitted by the terminals 1 to 4, and the access point separating the BA frame on the basis of the pattern signals.

Alternatively, the terminals 1 to 4 may simultaneously transmit the BA frame using uplink (UL) OFDMA.

Alternatively, as a further example of the uplink user multiplexed transmission, it is also possible to use a scheme that combines UL-OFDMA and UL-MU-MIMO. According to this scheme, the terminals eligible as the destinations of the transmission are sorted into multiple sets, and UL-MU-MIMO is carried out for each set using one resource unit. For example, the terminal 1 and the terminal 2 carries out UL-MU-MIMO using the same resource unit, and the terminal 3 and the terminal 4 carry out UL-MU-MIMO using the same resource unit which is different from that used by the terminal 1 and the terminal 2.

Modified Example 4

In the sequence of FIG. 4, the report frames 511, 521, 531, and 541 are transmitted sequentially from the terminals 1 to 4. Meanwhile, the report frames 511, 521, 531, and 541 may be transmitted by UL-MU transmission. As a scheme of UL-MU transmission, combination of MU-MIMO and OFDMA, or MU-MIMO and OFDMA, can be used. According to this scheme, it is not necessary to transmit the poll frames 503 to 505 from the access point 11. For example, the terminals 1 to 4 may simultaneously transmit the report frames 511, 521, 531, and 541 by uplink multiplexed transmission upon the lapse of a predetermined time after completion of reception of the channel estimation frames 502. Alternatively, the access point 11 may transmit a trigger frame that notifies the information necessary for UL-MU transmission upon the lapse of a predetermined time after transmission of the channel estimation frames 502. In this case, the terminals 1 to 4 transmit the report frames 511, 521, 531, and 541 by MU-UL transmission upon the lapse of a predetermined time after completion of reception of the trigger frame. It is assumed here that the resource (pattern signal or resource unit) used in MU-UL is specified by the trigger frame.

Second Embodiment

Figure 16:
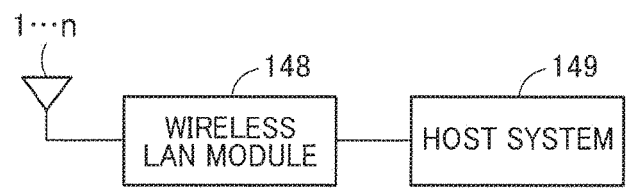
FIG. 16 is a diagram showing an exemplary entire configuration of a terminal or access point.

FIG. 16 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the above any embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external devices according to an arbitrary communication protocol. The communication protocol may include the TCP/IP and a protocol of a layer upper than that. Alternatively, the TCP/IP may be mounted on the wireless LAN module 148, and the host system 149 may execute only a protocol in a layer upper than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 17:
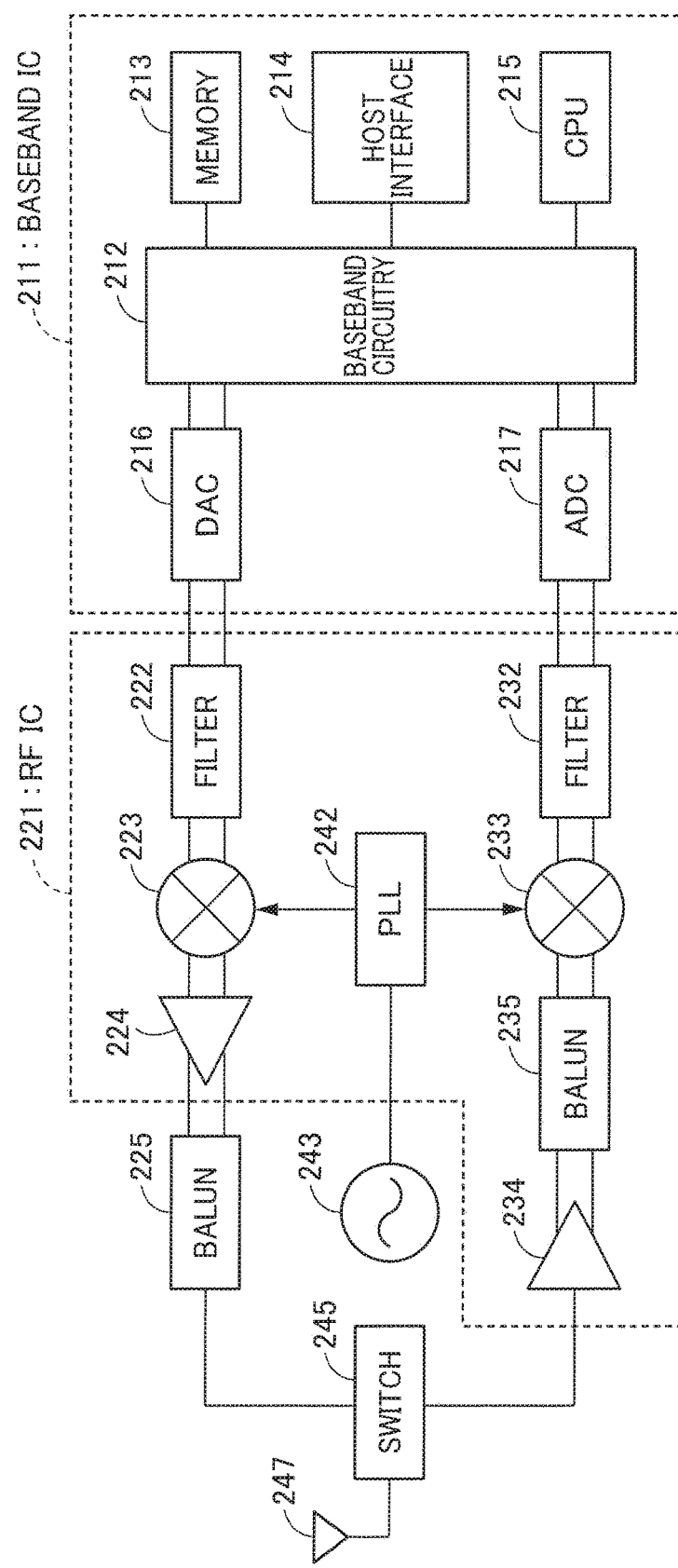
FIG. 17 is a diagram showing an exemplary hardware configuration of a wireless communication device installed at an access point or terminal according to a third embodiment.

FIG. 17 shows an example of hardware configuration of a wireless LAN module. The configuration can also be applied when the wireless communication device (or a wireless device) is mounted on either one of the terminal that is a non-base station and the base station (access point). That is, the configuration can be employed as a configuration example of the wireless communication device in FIG. 1. In the drawing, one antenna is shown by reference numeral 247 although the access point may provide two or more antennas. In case of a plurality of antennas, a plurality of sets of a transmission system (216 and 222 to 225), a reception system (232 to 235), a PLL 242, a crystal oscillator (reference signal source) 243, and a switch 245 may be arranged according to the antennas, and each set may be connected to a control circuit 212. The PLL 242 or the crystal oscillator 243 or both of them corresponds to an oscillator according to an embodiment.

The wireless LAN module (wireless communication device or wireless device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM and a DRAM, or may be a non-volatile memory, such as a NAND and an MRAM.

The host interface 214 is an interface for connection to the host system. The interface can be anything, such as UART, SPI, SDIO, USB, and PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control device that controls communication or the controller that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process, and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters. The RF IC 221 is connected to the antenna 247 through the switch 245.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the balun 234 or the RF IC 221 on the reception side during the reception. The baseband IC 211 or the RF IC 221 may control the switch 245. There may be another circuit that controls the switch 245, and the circuit may control the switch 245.

Figure 18:
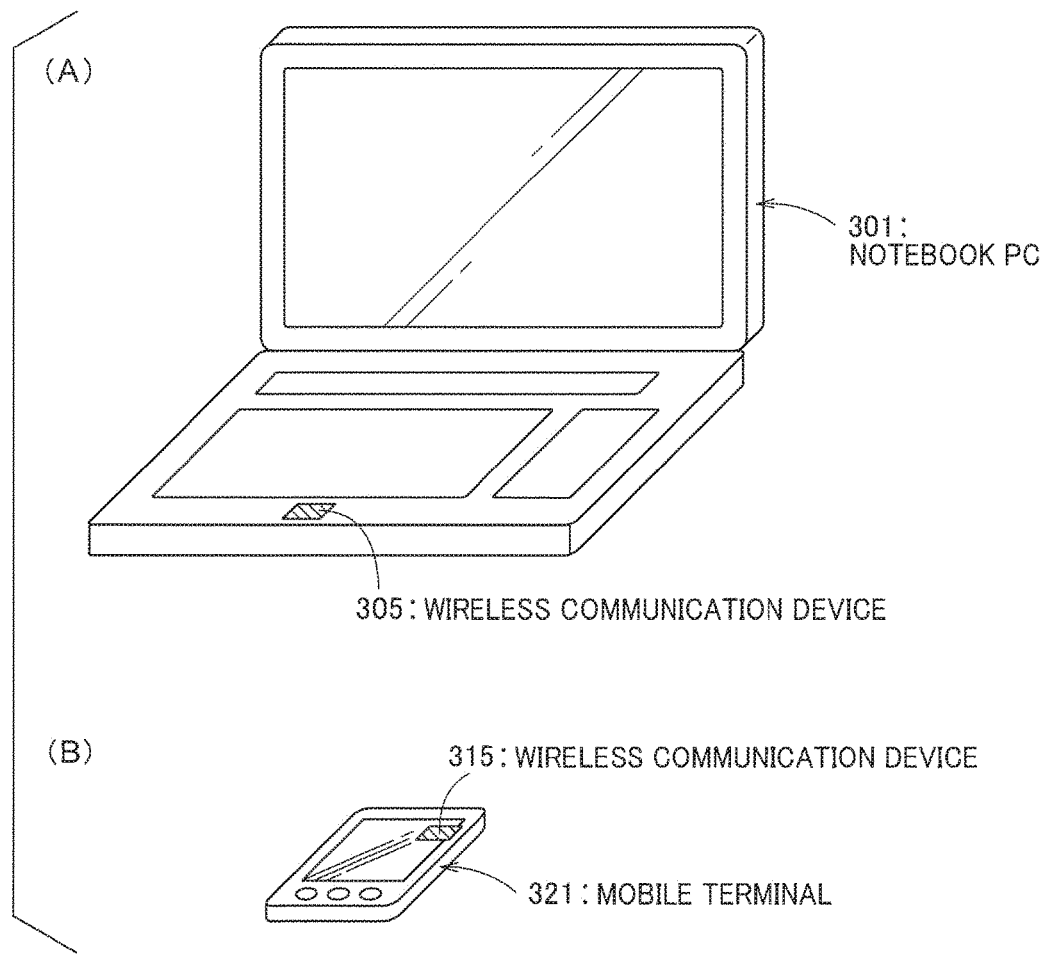
FIG. 18 shows perspective views of a terminal according to a fourth embodiment.

In a case that the module of FIG. 18 is an access point, the switch 245 controls the directivities of the antennas 1 to n according to an instruction signal of the baseband IC 211, the baseband circuit 212 or the CPU 215. For example, each antenna has a plurality of branches, and the switches controls an impedance or a resistance of each of branches in each antenna to control the directivity of each antenna.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

The more detailed explanation of each elements in the above stated configuration is obvious from the explanation of FIG. 1 and is thus omitted.

Third Embodiment

FIG. 18(A) and FIG. 18 (B) are perspective views of wireless terminal according to the third embodiment. The wireless terminal in FIG. 18 (A) is a notebook PC 301 and the wireless communication device (or a wireless device) in FIG. 18 (B) is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/ service provider access point, a portable device, a handheld device and so on.

Figure 19:
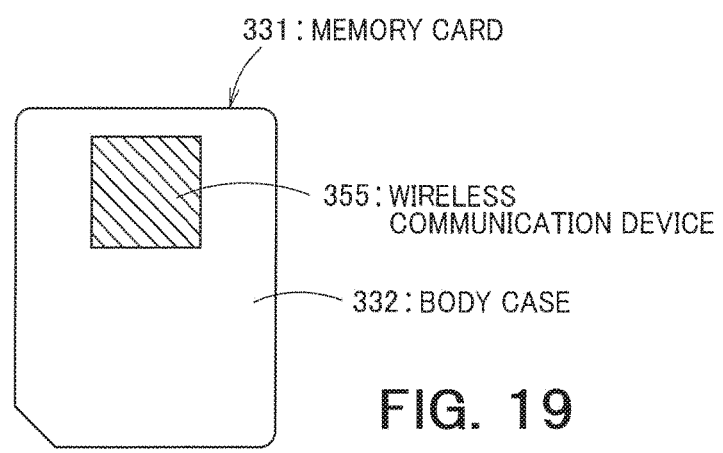
FIG. 19 is a diagram showing a memory card according to the fourth embodiment.

Moreover, a wireless communication device installed in a terminal (which may indicate a base station) can also be provided in a memory card. FIG. 19 illustrates an example of a wireless communication device mounted on a memory card. A memory card 331 contains a wireless communication device 355 and a body case 332. The memory card 331 uses the wireless communication device 355 for wireless communication with external devices. Here, in FIG. 19, the description of other installed elements (for example, a memory, and so on) in the memory card 331 is omitted.

Fourth Embodiment

In the fourth embodiment, a bus, a processor unit and an external interface unit are provided in addition to the configuration of the wireless communication device of the terminal (which may indicate the base station) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Fifth Embodiment

In the fifth embodiment, a clock generating unit is provided in addition to the configuration of the wireless communication device of the terminal (which may indicate the base station or both of them) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

Sixth Embodiment

In the sixth embodiment, a power source unit, a power source controlling unit and a wireless power feeding unit are included in addition to the configuration of the wireless communication device of the terminal (which may indicate the base station) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

Seventh Embodiment

In the seventh embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

Eighth Embodiment

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

Ninth Embodiment

In the tenth embodiment, an LED unit is added to the configuration of the wireless communication device of the terminal (which may indicate the base station or both of them) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

Tenth Embodiment

In the tenth embodiment, a vibrator unit is included in addition to the configuration of the wireless communication device wireless communication device of the terminal (which may indicate the base station or both of them) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

Eleventh Embodiment

In the eleventh embodiment, the configuration of the wireless communication device includes a display in addition to the configuration of the wireless communication device (the wireless communication device of the terminal (which may indicate the base station or both of them) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

Twelfth Embodiment

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are successfully shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection, there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. The frame for disconnection may be referred to as "release frame" by the meaning of releasing connection, for example. Normally, it is determined that the connection is disconnected at the timing of transmitting the release frame in a wireless communication device on the side to transmit the release frame and at the timing of receiving the release frame in a wireless communication device on the side to receive the release frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the release frame cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in the IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Carrier Avoidance is a suitable scheme to share a radio medium between the plurality of wireless communication devices.

[4] Frame Interval of Wireless LAN

The frame interval of the IEEE802.11 wireless LAN is described. There are several types of frame intervals used in the IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in the IEEE802.11 wireless LAN, and a strict period from a previous frame is not discussed. Therefore, the definition is followed in the explanation of the IEEE802.11 wireless LAN system. In the IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In the IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 20:
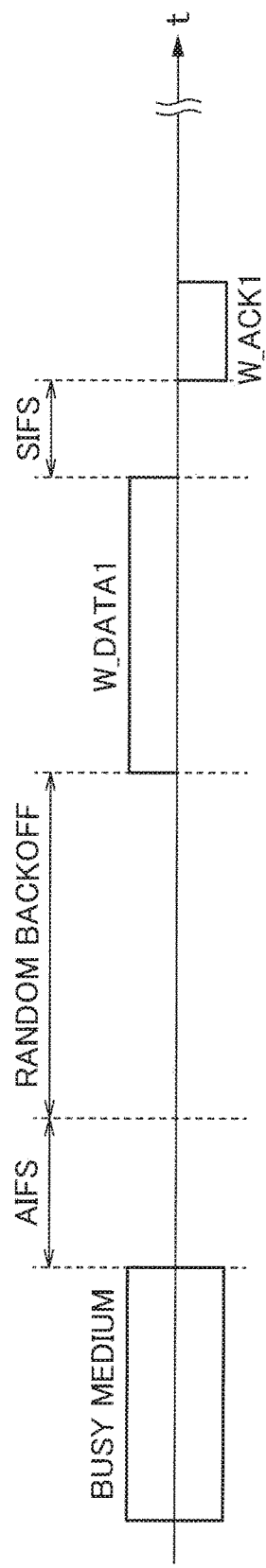
FIG. 20 is a diagram showing an example of frame exchange during a contention period.

Here, FIG. 20 illustrates one example of frame exchange in a competitive period based on the random access in the IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in the IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS. In the present embodiment, a wireless communication system using parameters at such interframe spaces is assumed to be an interfering system with a wide communication range.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device comprising:
a transmitter configured to transmit a first frame for channel estimation via a channel;
a receiver configured to receive a second frame in response to the first frame, wherein the second frame includes channel information indicative of a state of the channel; and
controlling circuitry,
wherein the transmitter is configured to transmit a third frame by beamforming based on the channel information at a transmission rate;
the receiver is configured to receive a fourth frame to specify a communication quality of the channel in response to the third frame;
the controlling circuitry is configured to specify the communication quality based on the fourth frame and control a transmission timing of a next first frame based on the communication quality and the transmission rate used for transmission of the third frame.

2. The wireless communication device according to claim 1, wherein the controlling circuitry is configured to compare the transmission rate with a reference rate in response to the communication quality not satisfying a criterion, and determine to either: lower the transmission rate of the third frame; or transmit the next first frame.

3. The wireless communication device according to claim 2, wherein the controlling circuitry is configured to determine to transmit the next first frame in response to the transmission rate being equal to or lower than the reference rate, and determine to lower the transmission rate in response to the transmission rate being larger than the reference rate,
wherein the reference rate is a rate that is lower by a predetermined stage than an initial transmission rate applied for transmission of the third frame, and a size of the predetermined stage becomes larger in response to the initial transmission rate becoming higher.

4. The wireless communication device according to claim 1, wherein
the transmitter is configured to transmit the first frame to a plurality of other wireless communication devices,
the receiver is configured to receive second frames from the other wireless communication devices,
the transmitter is configured to multiplex and transmit a plurality of third frames to the other wireless communication devices, and
the controlling circuitry is configured to carry out control such that the next first frame is transmitted at an earlier timing in response to a multiplex number of the other wireless communication devices becoming larger.

5. The wireless communication device according to claim 4, wherein
the controlling circuitry is configured to determine for the respective other wireless communication devices that the communication quality does not satisfy a criterion when fourth frames indicative of successful reception of the third frame are not successfully received consecutively for a predetermined number of times, and
the controlling circuitry is configured to decrease the value of the predetermined number of times when the next first frame is transmitted at an earlier timing, and increase the value of the predetermined number of times when the next first frame is transmitted at a later timing.

6. The wireless communication device according to claim 4, wherein
the controlling circuitry is configured to determine for the respective other wireless communication devices that the communication quality does not satisfy a criterion when a probability of fourth frames indicating successful reception of the third frame not having been successfully received is equal to or larger than a predetermined value, and
the controlling circuitry is configured to decrease the predetermined value when the next first frame is transmitted at an earlier timing and increase the predetermined value when the next first frame is transmitted at a later timing.

7. The wireless communication device according to claim 4, wherein
the reference rate is a rate that is lower by a predetermined stage than an initial transmission rate applied for transmission of the third frame, and
the controlling circuitry is configured to decrease a size of the predetermined stage when the next first frame is transmitted at an earlier timing and increase the size of the predetermined stage when the next first frame is transmitted at a later timing.

8. The wireless communication device according to claim 1, wherein
the transmitter is configured to transmit the first frame to a plurality of other wireless communication devices,
the receiver is configured to receive second frames from the other wireless communication devices,
the transmitter is configured to multiplex and transmit a plurality of third frames to the other wireless communication devices, and
the controlling circuitry is configured to count the number of other wireless communication devices from which fourth frames indicative of successful reception of the third frames are not successfully received, and carry out control such that the first next frame is transmitted at a later timing as the number of times of the counted devices becoming equal to or larger than a predetermined value is larger.

9. The wireless communication device according to claim 1, further comprising at least one antenna.

10. The wireless communication device according to claim 1, wherein the fourth frame is an acknowledgement response frame to specify successful reception or unsuccessful reception of the third frame.

11. A wireless communication method comprising:
transmitting a first frame for channel estimation via a channel;
receiving a second frame in response to the first frame, wherein the second frame includes channel information indicative of a state of the channel;
transmitting a third frame by beamforming based on the channel information at a transmission rate;
receiving a fourth frame to specify a communication quality of the channel in response to the third frame;

specifying the communication quality based on the fourth frame; and controlling a transmission timing of a next first frame based on the communication quality and the transmission rate used for transmission of the third frame.

12. The wireless communication method according to claim 11, comprising: comparing the transmission rate with a reference rate in response to the communication quality not satisfying a criterion, and determining to either: lower the transmission rate of the third frame; or transmit the next first frame.

13. The wireless communication method according to claim 12, comprising:

determining to transmit the next first frame in response to the transmission rate being equal to or lower than the reference rate, and determining to lower the transmission rate in response to the transmission rate being larger than the reference rate, wherein the reference rate is a rate that is lower by a predetermined stage than an initial transmission rate applied for transmission of the third frame, and a size of the predetermined stage becomes larger in response to the initial transmission rate becoming higher.

14. The wireless communication method according to claim 11, comprising:

transmitting the first frame to a plurality of other wireless communication devices, receiving second frames from the other wireless communication devices, multiplexing and transmitting a plurality of third frames to the other wireless communication devices, and carrying out control such that the next first frame is transmitted at an earlier timing in response to a multiplex number of the other wireless communication devices becoming larger.

15. The wireless communication method according to claim 14, comprising:

determining for the respective other wireless communication devices that the communication quality does not satisfy a criterion when fourth frames indicative of successful reception of the third frame are not successfully received consecutively for a predetermined number of times, and decreasing the value of the predetermined number of times when the next first frame is transmitted at an earlier timing, and increase the value of the predetermined number of times when the next first frame is transmitted at a later timing.

16. The wireless communication method according to claim 14, comprising:

determining for the respective other wireless communication devices that the communication quality does not satisfy a criterion when a probability of fourth frames indicating successful reception of the third frame not having been successfully received is equal to or larger than a predetermined value, and decreasing the predetermined value when the next first frame is transmitted at an earlier timing and increase the predetermined value when the next first frame is transmitted at a later timing.

17. The wireless communication method according to claim 14, wherein the reference rate is a rate that is lower by a predetermined stage than an initial transmission rate applied for transmission of the third frame, and the method comprising decreasing a size of the predetermined stage when the next first frame is transmitted at an earlier timing and increasing the size of the predetermined stage when the next first frame is transmitted at a later timing.

18. The wireless communication method according to claim 11, comprising:

transmitting the first frame to a plurality of other wireless communication devices, receiving second frames from the other wireless communication devices, multiplexing and transmitting a plurality of third frames to the other wireless communication devices, and counting the number of other wireless communication devices from which fourth frames indicative of successful reception of the third frames are not successfully received, and carry out control such that the next first frame is transmitted at a later timing as the number of times of the counted devices becoming equal to or larger than a predetermined value is larger.

* * * * *